United States Patent [19]

Miyazono

[11] Patent Number: 5,745,450
[45] Date of Patent: Apr. 28, 1998

[54] FOCUSING SERVO SYSTEM AND FOCUS SERVO ACQUISITION ENABLE WITH MULTIPLE VELOCITY ACQUISITION MODES

[75] Inventor: Shunichi Miyazono, Chiba, Japan

[73] Assignee: Sony Corporation, Tokyo, Japan

[21] Appl. No.: 801,547

[22] Filed: Feb. 18, 1997

Related U.S. Application Data

[60] Continuation of Ser. No. 405,504, Mar. 16, 1995, abandoned, which is a division of Ser. No. 221,892, Mar. 30, 1994.

[30] Foreign Application Priority Data

Apr. 2, 1993 [JP] Japan ..................................... 5-098323
Sep. 8, 1993 [JP] Japan ..................................... 5-246113

[51] Int. Cl.$^6$ ....................................................... G11B 7/09
[52] U.S. Cl. ..................... 369/44.27; 369/44.29; 369/44.25; 369/44.35
[58] Field of Search ................ 369/44.27, 44.29, 369/44.35, 44.28, 44.25, 54; 250/201.5

[56] References Cited

U.S. PATENT DOCUMENTS

| 4,368,526 | 1/1983 | Harigae et al. ........................ 369/45 |
| 4,544,837 | 10/1985 | Tanaka et al. ........................ 250/201 |
| 4,998,233 | 3/1991 | Dimatteo et al. ..................... 369/44.25 |
| 5,060,215 | 10/1991 | Kawamura et al. ................... 369/44.35 |
| 5,162,661 | 11/1992 | Sato et al. ............................ 250/561 |
| 5,187,696 | 2/1993 | Ishii et al. ............................ 369/44.29 |
| 5,202,871 | 4/1993 | Yokota ................................. 369/44.29 |
| 5,352,881 | 10/1994 | Matsueda ............................. 250/201.5 |
| 5,459,309 | 10/1995 | Kagami et al. ....................... 250/201.5 |

FOREIGN PATENT DOCUMENTS

WO 86/05306   9/1986   WIPO .

OTHER PUBLICATIONS

Patent Abstracts of Japan, vol. 10, No. 93 (P-445), 10 Apr. 1986 & JP-A-60 226 029 (Sony KK), 11 Nov. 1985.
Patent Astracts of Japan, vol. 6, No. 175 (P-141) (1053), 9 Sep. 1982 & JP-A-57 092 439 (Matsushita Denki Sangyo KK), 9 Jun. 1982.
Patent Abstracts of Japan, vol. 14, No. 269 (P-1059), 11 Jun. 1990 & JP-A-02 076 128 (Pioneer Electron Corp), 15 Mar. 1990.
Patent Abstracts of Japan, vol. 16, No. 424 (P-1415), 7 Sep. 1992 & JP-A-04 143 930 (Alpine Electronics Inc.), 18 May 1992 & US-A 5,202,871 (Yokota), 13 Apr. 1993.

*Primary Examiner*—Thang V. Tran
*Attorney, Agent, or Firm*—Limbach & Limbach L.L.P.

[57]   ABSTRACT

A focusing servo system includes an objective lens which is driven to move toward and/or away from a recording medium during focus searching operations. The objective lens is driven at a first relatively high velocity and then switches to a second relatively low velocity based on a focus acquisition enable signal or on an in-focus detection signal. After the focus searching operations, the movement of the objective lens may be servo-controlled.

4 Claims, 23 Drawing Sheets

F I G. 3(a)
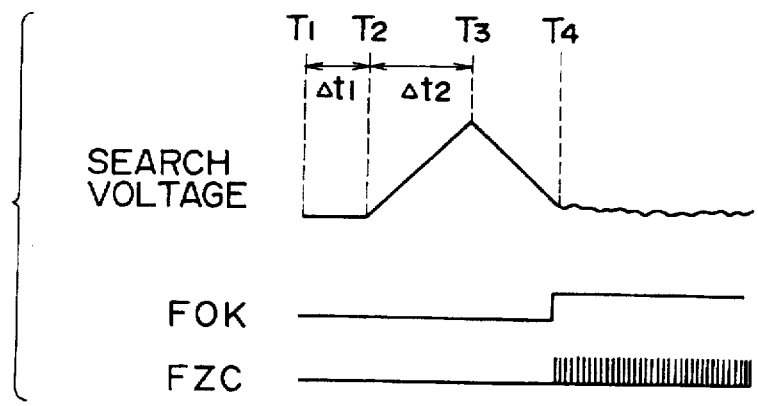
F I G. 3(b)
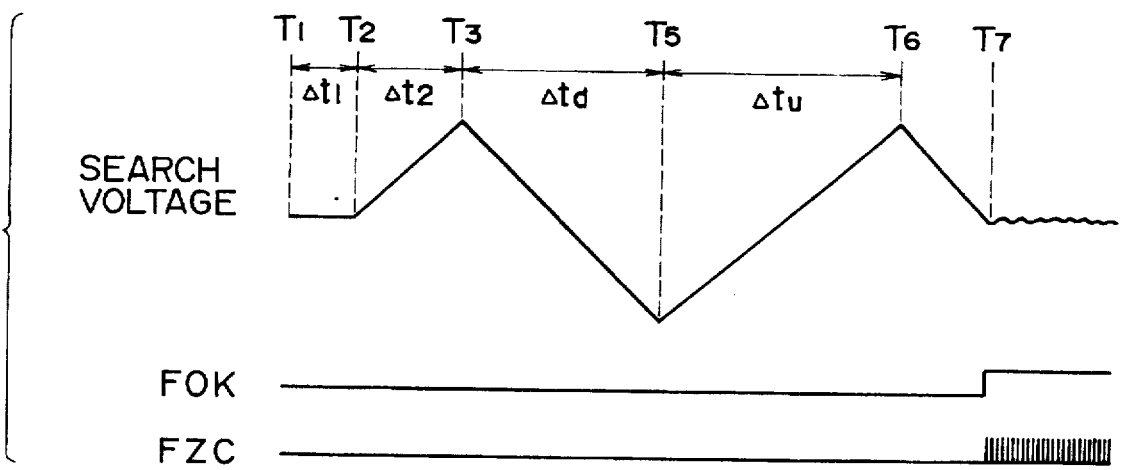
F I G. 3(c)
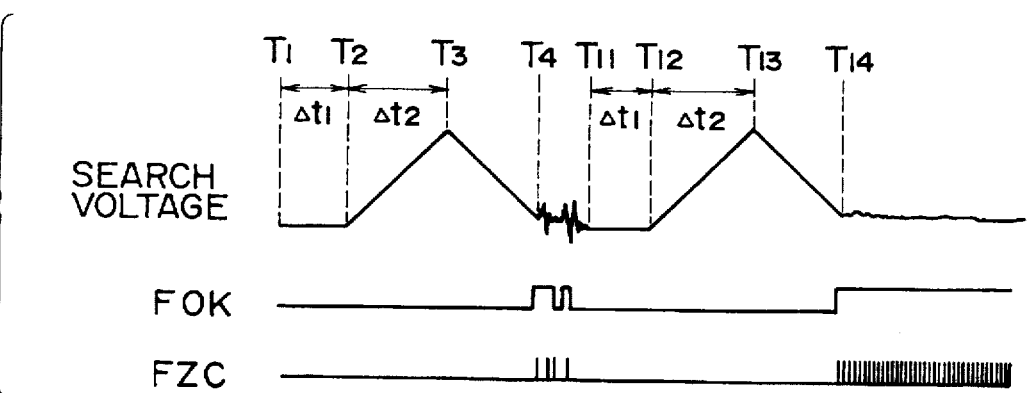

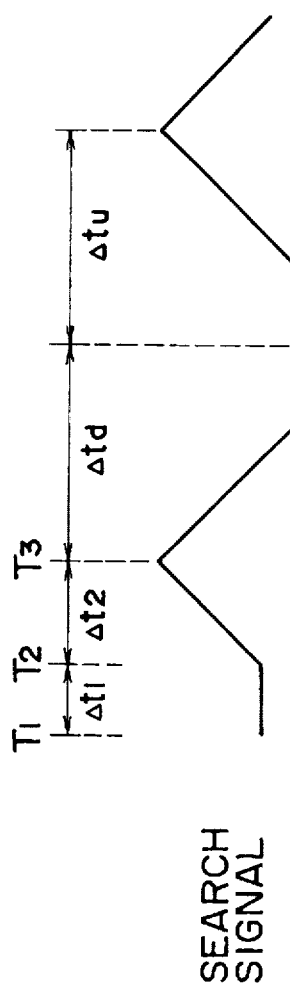
F I G. 5(a)
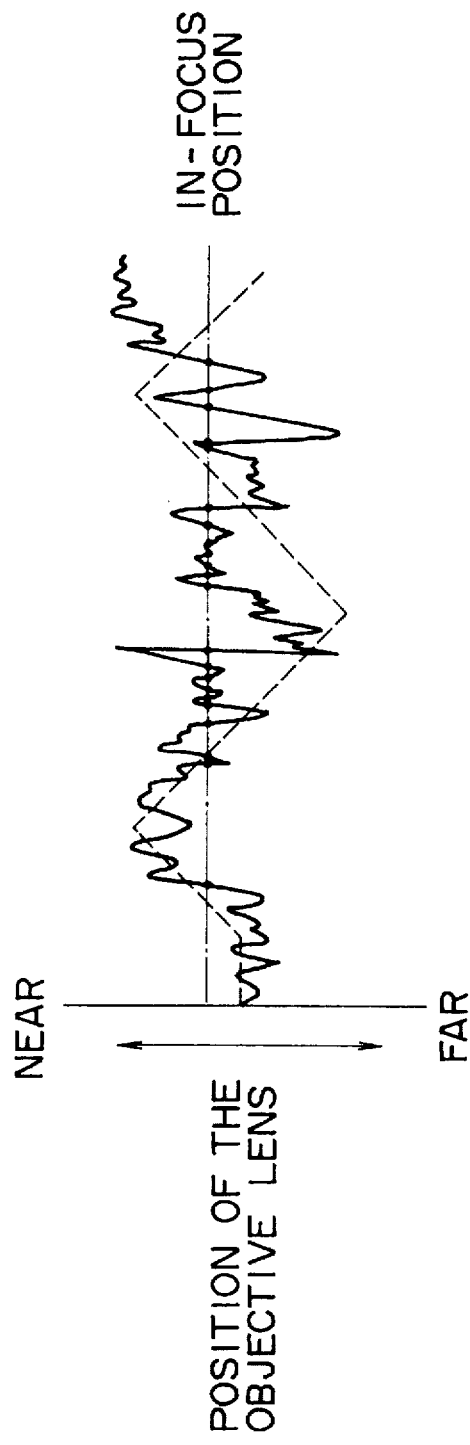
F I G. 5(b)

| FIG. 7(a) | FIG. 7(b) |

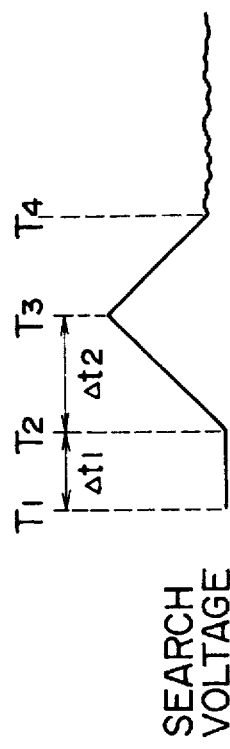
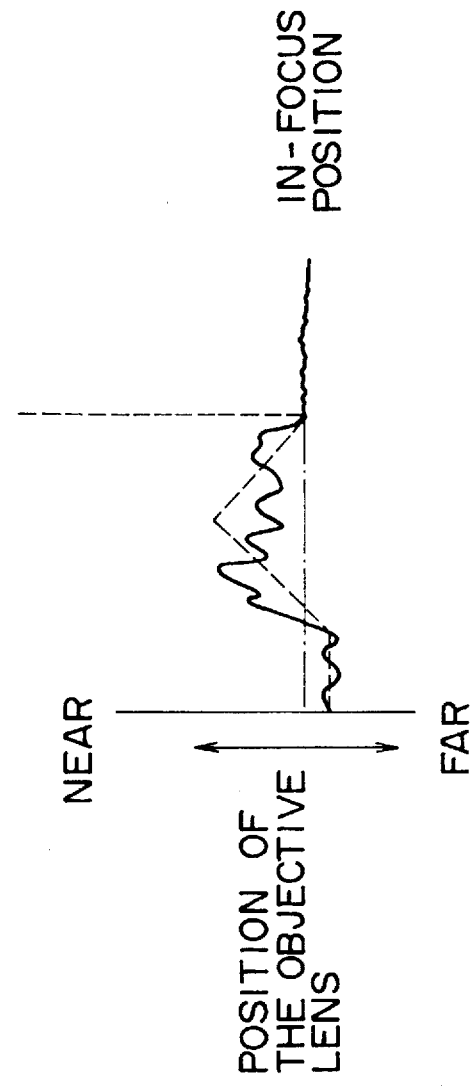
FIG. 8(a)
FIG. 8(b)
FIG. 8(c)
FIG. 8(d)

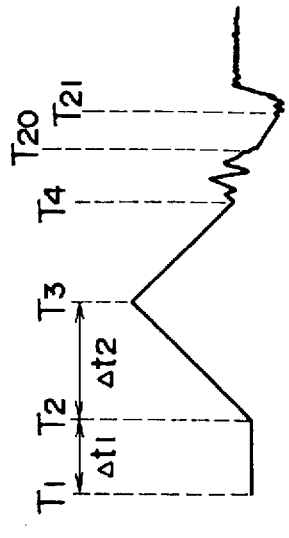
FIG. 9(a) SEARCH VOLTAGE
FIG. 9(b) FOK
FIG. 9(c) FZC
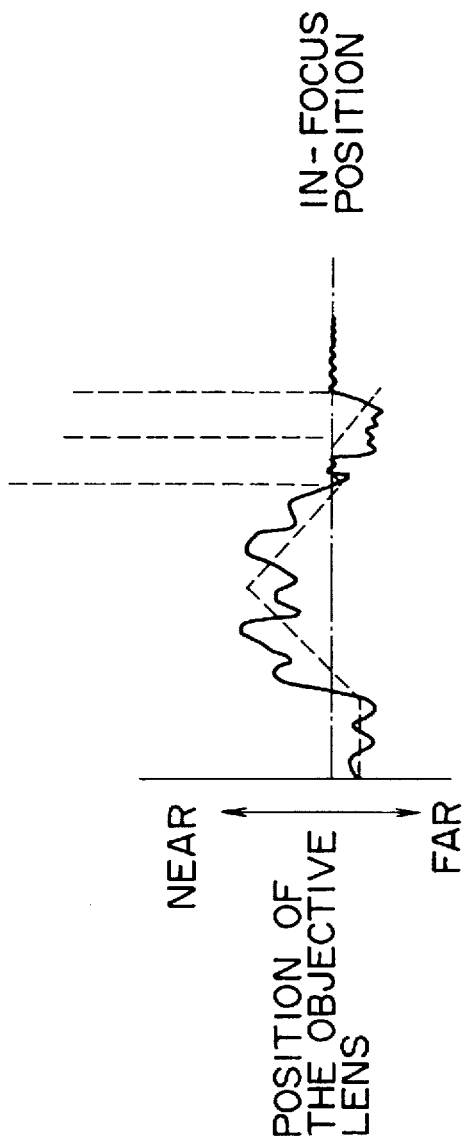
FIG. 9(d)

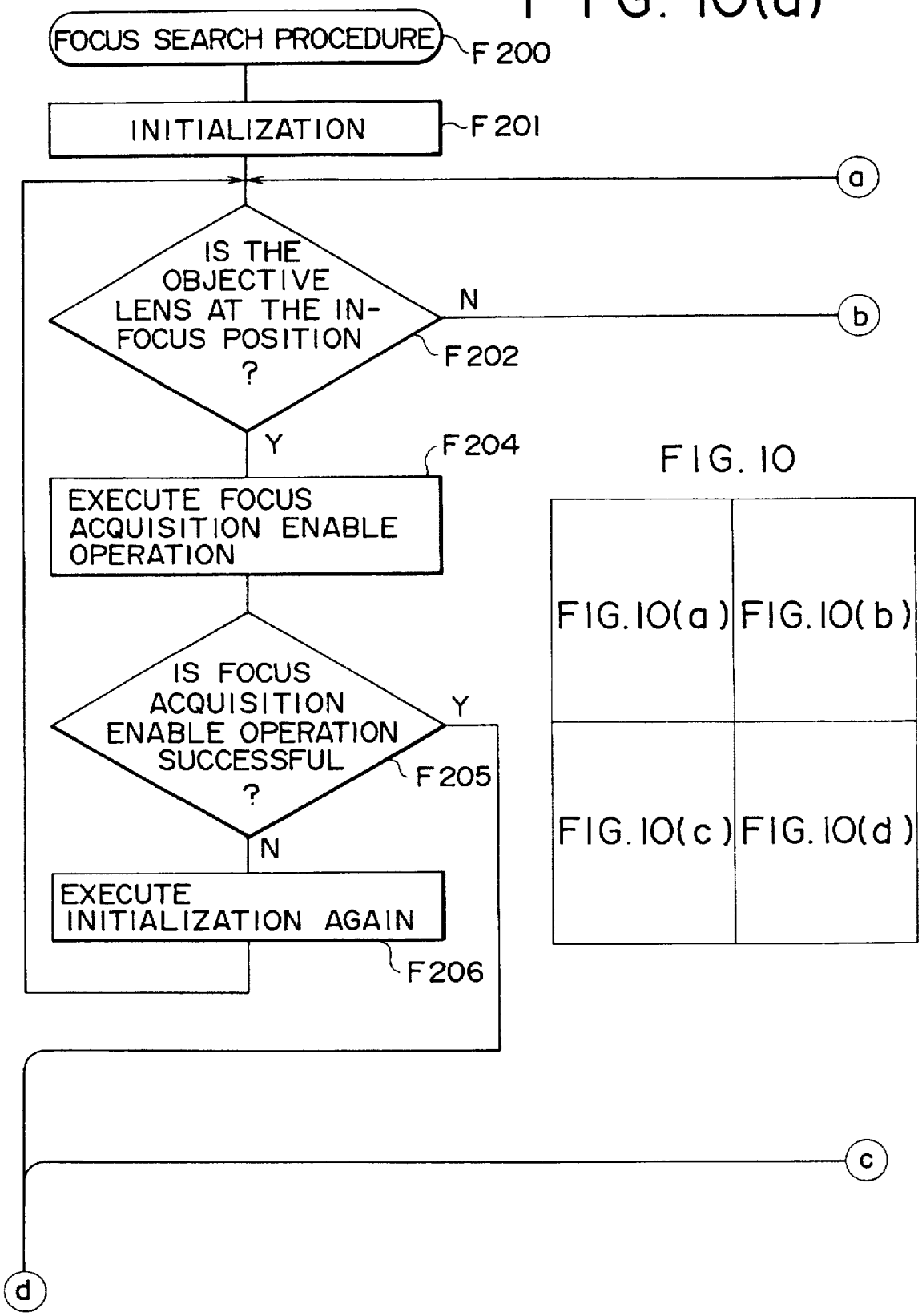

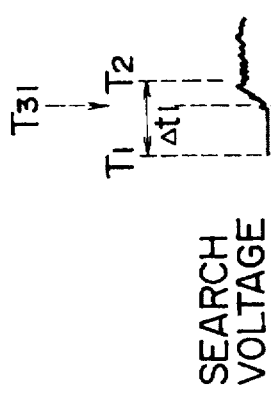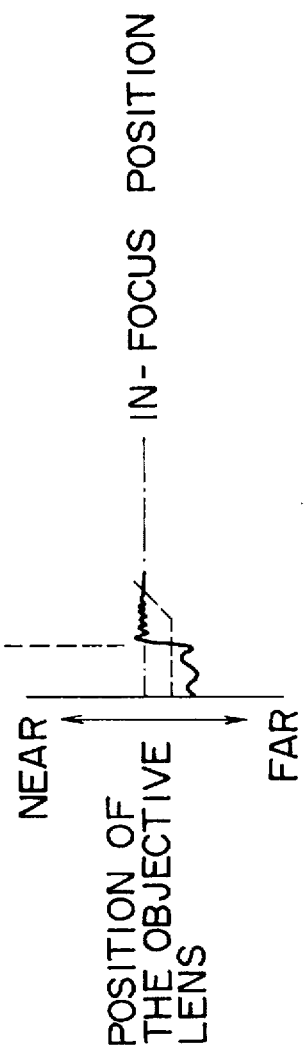
FIG. 11(a) SEARCH VOLTAGE
FIG. 11(b) FOK
FIG. 11(c) FZC
FIG. 11(d) POSITION OF THE OBJECTIVE LENS

1

FOCUSING SERVO SYSTEM AND FOCUS SERVO ACQUISITION ENABLE WITH MULTIPLE VELOCITY ACQUISITION MODES

This is a continuation of application Ser. No. 08/405,504 filed on Mar. 16, 1995, now abandoned, which is a divisional application of application Ser. No. 08/221,892 filed on Mar. 30, 1994.

BACKGROUND OF THE INVENTION

1. Field of the Invention

The present invention relates to a focusing servo system and a focusing servo acquisition enable method and, more particularly, to a focusing servo system for an optical recording/reproducing apparatus, and a focusing servo acquisition enable method.

2. Description of the Related Art

In an optical recording apparatus for recording information on a disk-shaped recording medium, such as an optical disk or a magnetooptic disk, or an optical reproducing apparatus for reproducing information recorded on a recording medium, the light beam emitted by an optical head must be focused correctly on the recording surface of the recording disk. Therefore, the optical recording apparatus or the optical reproducing apparatus is provided with a focusing servo system which drives the objective lens of the optical head for movement toward and away from the recording surface of the recording disk. Since a range in which a focusing servo action is possible, i.e., a focus acquisition enable range, is comparatively narrow, the objective lens is moved into the focus acquisition enable range by a focus search operation at the start of recording/reproducing operation or after track access, and then a focusing servo loop is turned on to carry out the focusing servo action. When starting recording operation or reproducing operation, spindle servo action and tracking servo action are executed after a focus search action and a focusing servo action have been executed. After the starting procedure has been completed, the scanning operation of the light beam for recording or reproducing is possible.

During the focus search operation, for example, the objective lens is moved forcibly between a position farthest from the surface of the disk and a position nearest to the surface of the disk, in which a focus error signal $E_F$ represented by an S-shaped curve in FIG. 1(b) is obtained by processing the output of the four-division detector of the optical head for detecting reflected light. FIG. 1(a) shows the sum signal, i.e., a signal $R_F$, of the four-division detector. The signal $R_F$ is compared with a given threshold Th to obtain a FOK signal as shown in FIG. 1(c), which indicates a focusing servo enable range. After the objective lens is moved into the focus acquisition enable range corresponding to a period H in which the FOK signal is HIGH by the focus search operation, the focusing servo system is actuated for correct focusing control; that is, focusing servo control is executed to adjust the objective lens to the trailing edge of a focus zero crossing detection signal FZC shown in FIG. 1(d) in the focus acquisition enable range.

The focus search operation will be described hereinafter with reference to a flow chart shown in FIG. 2 and waveform diagrams of FIGS. 3(a) to 3(c) showing waveforms in different modes of focus search operation.

Referring to FIG. 2, a focus search operation is started in step F10, the focusing servo system is initialized in a time $\Delta t_1 = 200$ msec, i.e., a period between times $T_1$ and $T_2$ in FIGS. 3(a) to 3(c), in step F11. In the time $\Delta t_1$, the rotation speed of the spindle rises and the objective lens is set at an initial position. Then, an initial up-search operation is executed in a time $\Delta t_2 = 500$ msec, i.e., a period between times $T_2$ and $T_3$ in FIGS. 3(a) to 3(c), in step F12 to move the objective lens to a position nearest to the disk in order that a search operation is started from the position nearest to the disk.

After the initializing operations have been completed, an actual search operation, namely, an operation for detecting a focus acquisition enable range, is executed while the objective lens is moved. First a down-search operation, i.e., an operation to move the objective lens away from the disk from the position nearest to the disk, is executed in step F13, in which a search driving voltage is applied to a focusing coil at time $T_3$ (FIGS. 3(a) to 3(c)) for down-search. During the down-search operation, a FOK signal is detected in search of a focus point in step F14. For example, if the FOK signal goes HIGH and a focus acquisition enable range is detected at time $T_4$ (FIG. 3(a)), namely, if the response to a query in step F14 is affirmative, a focusing servo loop for correctly focusing the objective lens is closed in step F16. If the focus acquisition enable range is detected successfully (FIG. 3(a)), the focus search operation is terminated in step F19.

If the focus point could not be detected during down-search operation, the down-search operation is continued until the objective lens reaches the farthest position, and then an up-search operation, i.e., a search operation to move the objective lens from the farthest position toward the disk, is executed; that is, the down-search operation is continued for a predetermined time $\Delta t_d$ (FIG. 3(b)), and then the up-search operation is started (steps F15 and F18). As shown in FIG. 3(b), the up-search operation is performed for a time $\Delta t_u$ between times $T_5$ and $T_6$, in which the objective lens is moved toward the nearest position, and then the down-search operation is started again at time $T_6$ in step F13 to detect the focus point. The flow chart of FIG. 2 shows a procedure by which the focus point cannot be detected by the up-search operation by way of example. FIG. 3(b) shows an operation by which focus acquisition is achieved at time $T_7$ and the focus search operation is terminated (steps F14→F16→F17→F19).

In some cases, as shown in FIG. 3(c), the focusing servo system fails in achieving focus acquisition due to disturbance or the like even if the focus point is detected. FIG. 3(c) shows a case in which a focus acquisition enable operation is started at time $T_4$, but the focusing servo system fails in focus acquisition and the FOK signal goes LOW. Upon the detection of the change of the FOK signal from HIGH to LOW, the focus search operation is started again at time $T_{11}$; that is the procedure returns from step F17 to step F11. Then, the initializing operation is executed between times $T_{11}$ and $T_{12}$ in step F11, the initial up-search operation is executed between times $T_{12}$ and $T_{13}$ in step F12 and the focus acquisition enable operation is carried out in a down-search mode. For example, the focus-search operation is achieved successfully at time $T_{14}$ and the focus search operation is terminated.

Incidentally, it is important to complete the the focus search operation quickly. The quick focus search operation reduces the time necessary for starting the optical disk reproducing system and enables the optical disk reproducing system to start the reproducing operation quickly.

An optical disk reproducing system stores data read from a disk temporarily at a high rate in a buffer memory, reads the data at a comparatively low rate from the buffer memory and converts the data read from the buffer memory into audio signals in a predetermined timing so that the reproduced audio signals will not be interrupted even if the pickup head is dislocated from a correct tracking position by vibrations or disturbances. Since the data is stored in the buffer memory, the data accumulated in the buffer memory is read continuously even if the pickup head is dislocated from the correct tracking position and is disabled from reading data from the disk for a certain period of time. Therefore, the reproducing operation can be properly continued if track access operation is carried out and the reproducing operation is restarted before the data accumulated in the buffer memory is exhausted.

If the optical disk reproducing apparatus takes a comparatively long time in completing the starting operation after track access has been achieved, the data accumulated in the buffer memory decreases accordingly. For example, if tracking error occurs repeatedly in a short time, the buffer memory will be exhausted and reproduced sound will be interrupted. Thus, the delay in the starting operation is a significant problem particularly in an automotive optical disk apparatus which is subjected to vibrations.

Accordingly, the reduction of time necessary for starting operation has been an urgent problem and there has been a strong demand for the enhancement of the speed of focus search operation, which is effective in quickly completing the starting operation.

However, the foregoing known focus search operation needs a fixed time before starting the focus acquisition enable operation again after the focus acquisition enable operation has not been achieved as shown in FIG. 3(c). For example, suppose that the initializing period $\Delta t_1$=200 msec, the initial up-search period $\Delta t_2$=500 msec, the period between $T_4$ to $T_{11}$ necessary for detecting a failure in the focus acquisition enable operation is 50 msec, and the period from $T_{13}$ to $T_{14}$ when the focus acquisition enable range is detected is 450 msec, the focus acquisition enable operation will not be restarted for about 1200 msec after the initial focus acquisition enable operation has resulted in failure. Since such a long time elapses before the focus acquisition enable operation is restarted, the focus search operation will take a very long time and the reproduced sound will be interrupted if a failure in the focus acquisition enable operation occurs several times successively.

The focus search operation may be quickly completed if the search speed, i.e., the moving speed of the objective lens, is increased. However, if the search speed is excessively high, it is impossible to control the position of the objective lens according to the focus acquisition enable range (FOK signal). Therefore, the enhancement of the search speed is limited.

SUMMARY OF THE INVENTION

It is therefor an object of the present invention to provide a focus servo system which resolves the above-mentioned problem.

It is another object of the present invention to provide a focus acquisition method which resolves the above-mentioned problem.

According to the present invention, there is provided a focus servo system comprising: a signal generating unit, a servo unit, a zero crossing detecting unit, a search signal generating unit, and a control unit. The signal generating unit generates a focus error signal based on the displacement of the recording surface of an optical recording medium in a direction perpendicular to the recording surface through the detection of a light beam projected through an objective lens on the optical recording medium and reflected by the optical recording medium, a read signal on the basis of the reflected light beam, and a focus acquisition enable range detection signal representing a focus acquisition enable range on the basis of the read signal. The servo unit receives the focus error signal from the signal generating unit and executes a focusing servo operation for focusing the objective lens according to the focus error signal. The zero crossing detecting unit receives the focus error signal from the signal generating unit and detects a zero crossing point in the focus error signal. The search signal generating unit generates search signals for driving the objective lens for movement toward and away from the recording surface of the optical recording medium. The control unit receives the focus acquisition enable range detection signal generated by the signal generating unit and the zero crossing point detection signal provided by the zero crossing detecting unit. The control unit gives the search signal generated by the search signal generating unit and the focus error signal generated by the signal generating unit selectively to the servo system. The control unit changes the search signal generated by the search signal generating unit and supplied to the servo unit for the focus error signal generated by the signal generating unit on the basis of the focus acquisition enable range detection signal provided by the signal generating unit and the zero crossing point detection signal provided by the zero crossing detecting unit in a predetermined period after the start of the operation for moving the objective lens from the initial position away from the optical recording medium according to the search signal provided by the search signal generating unit.

According to the present invention, there is provided a focusing servo system including: signal generating unit, a servo unit, a zero crossing detecting unit, a search signal generating unit and a control unit. The signal generating unit provides a focus error signal based on the displacement of the recording surface of an optical recording medium in a direction perpendicular to the recording surface through the detection of a light beam projected through an objective lens on the optical recording medium and reflected by the optical recording medium, a read signal on the basis of the reflected light beam, and a focus acquisition enable range detection signal representing a focus acquisition enable range on the basis of the read signal. The servo unit receives the focus error signal from the signal generating unit and executes a focusing servo operation for focusing the objective lens according to the focus error signal. The zero crossing detecting unit receives the focus error signal from the signal generating unit and detects a zero crossing point in the focus error signal. The search signal generating unit generates search signals for driving the objective lens for movement toward and away from the recording surface of the optical recording medium. The control unit receives the focus acquisition enable range detection signal generated by the signal generating unit and the zero crossing point detection signal provided by the zero crossing detecting unit. The control unit moves the objective lens again away from the optical recording medium when the focus acquisition enable point could not be detected while the objective lens is moved away from the optical recording medium on the basis of the focus acquisition enable range detection signal and the zero-cross point detection signal.

According to the present invention, there is provided a focusing servo system that executes focus search procedure and detects a focus acquisition enable range by varying the position where a light beam for irradiating a disk-shaped recording medium is focused by driving an objective lens for movement according to a predetermined drive signal, and then closes a focusing servo loop to carry out a focusing servo operation. The focusing servo system comprises a first and a second focus search drive signal generating units and a control unit. The first focus search drive signal generating unit generates a first focus search drive signal for driving the objective lens for movement at a high speed in carrying out the focus search procedure. The second focus search drive signal generating unit generates a second focus search drive signal for driving the objective lens for movement at a low speed in carrying out the focus search procedure. The control unit makes the first focus search drive signal generating unit generate the first focus search drive signal from the start of the focus search procedure for a first focus search operation, makes the second focus search drive signal generating unit generate the second focus search drive signal for a second focus search operation from a predetermined point in time on the basis of a focus acquisition enable range detection signal detected in a first focus search period and/or an in-focus detection signal, and carries out a control operation to start a focusing servo operation on the basis of the focus acquisition enable range detection signal and/or the in-focus detection signal.

According to the present invention, there is provided a focus acquisition method comprising: moving an objective lens away from the recording surface of an optical recording medium from its initial position on the basis of a focus search signal; detecting a focus acquisition point on the basis of a zero crossing detection signal provided when the zero crossing point of a focus error signal provided while the objective lens is moved away from the recording surface of the optical recording medium and a signal indicating a focus acquisition enable range; deciding whether or not focus acquisition is achieved successfully on the basis of either the level of the signal indicating the focus acquisition enable range after the detection of the focus acquisition point or a signal read from the optical recording medium; continuously moving the objective lens further away from the recording surface of the optical recording medium when it is decided that the focus acquisition enable operation is unsuccessful.

According to the present invention, there is provided a focus acquisition method comprising: a first focus acquisition step to move an objective lens at a high speed alternately and periodically away from the recording surface of an optical recording medium and toward the recording surface of the optical recording medium; and a second focus acquisition step to move the objective lens at a low speed either away from the recording surface of the optical recording medium or toward the recording surface of the optical recording medium subsequently to the first focus acquisition step. The second focus acquisition step is started upon the coincidence of the level of a signal indicating a focus acquisition enable range with a predetermined level during the first focus acquisition step.

According to the present invention, the focus search operation is not returned to its initial stage and is continued to detect a focus point even if the focus search operation fails in focus acquisition enable operation, so that the focus search operation can be quickly carried out. The focus search operation is able to take advantage of a focus acquisition opportunity caused by external vibrations or the like. The focus acquisition enable operation can be repeated any number of times in a short period even if the focus acquisition enable operation results in failure.

Furthermore, according to the present invention, in the focus search operation, first a high-speed search operation is executed to obtain the focus acquisition enable range detection signal and/or the in-focus detection signal, and then a low-speed search operation is started when the focus acquisition range detection signal and/or the in-focus detection signal is obtained or a predetermined time after the focus acquisition range detection signal and/or the in-focus detection signal has been obtained. Accordingly, quick approach to the focus acquisition enable range is possible, the focus acquisition enable operation can be surely achieved, and a quick, highly reliable focus acquisition enable operation is possible.

BRIEF DESCRIPTION OF THE DRAWINGS

The invention will be more readily understood from the following description taken in connection with the accompanying drawings, wherein:

FIGS. 3(a) through 3(c) are diagrams of assistance in explaining a known focus search operation;

FIGS. 5(a) and 5(b) are diagrams of assistance in explaining a focus acquisition opportunity to be taken by a focusing servo system in a first embodiment according to the present invention;

FIGS. 8(a) through 8(d) are diagrams of assistance in explaining the focus search operation of the focusing servo system in the first embodiment;

FIGS. 9(a) through 9(d) are diagrams of assistance in explaining the focus search operation of the focusing servo system in the first embodiment;

FIGS. 10(a) through 13(b) are a flow chart of a focus search procedure to be executed by a focusing servo system in a second embodiment according to the present invention;

FIGS. 11(a) through 11(d) are diagrams of assistance in explaining the focus search operation of the focusing servo system in the second embodiment;

FIG. 12 is a block diagram of a focusing servo system in a third embodiment according to the present invention;

FIGS. 13(a) through 13(b) are a flow chart of a focus search procedure to be executed by the focusing servo system in the third embodiment;

DESCRIPTION OF THE PREFERRED EMBODIMENTS

Focusing servo systems embodying the present invention will be described hereinafter with reference to the accompanying drawings as applied to an optical recording/reproducing apparatus for recording information on, or reproducing information from an optical recording medium. First, an optical recording/reproducing apparatus to which a focusing servo system in accordance with the disclosed invention will be described with reference to FIG. 4.

Figure 4:
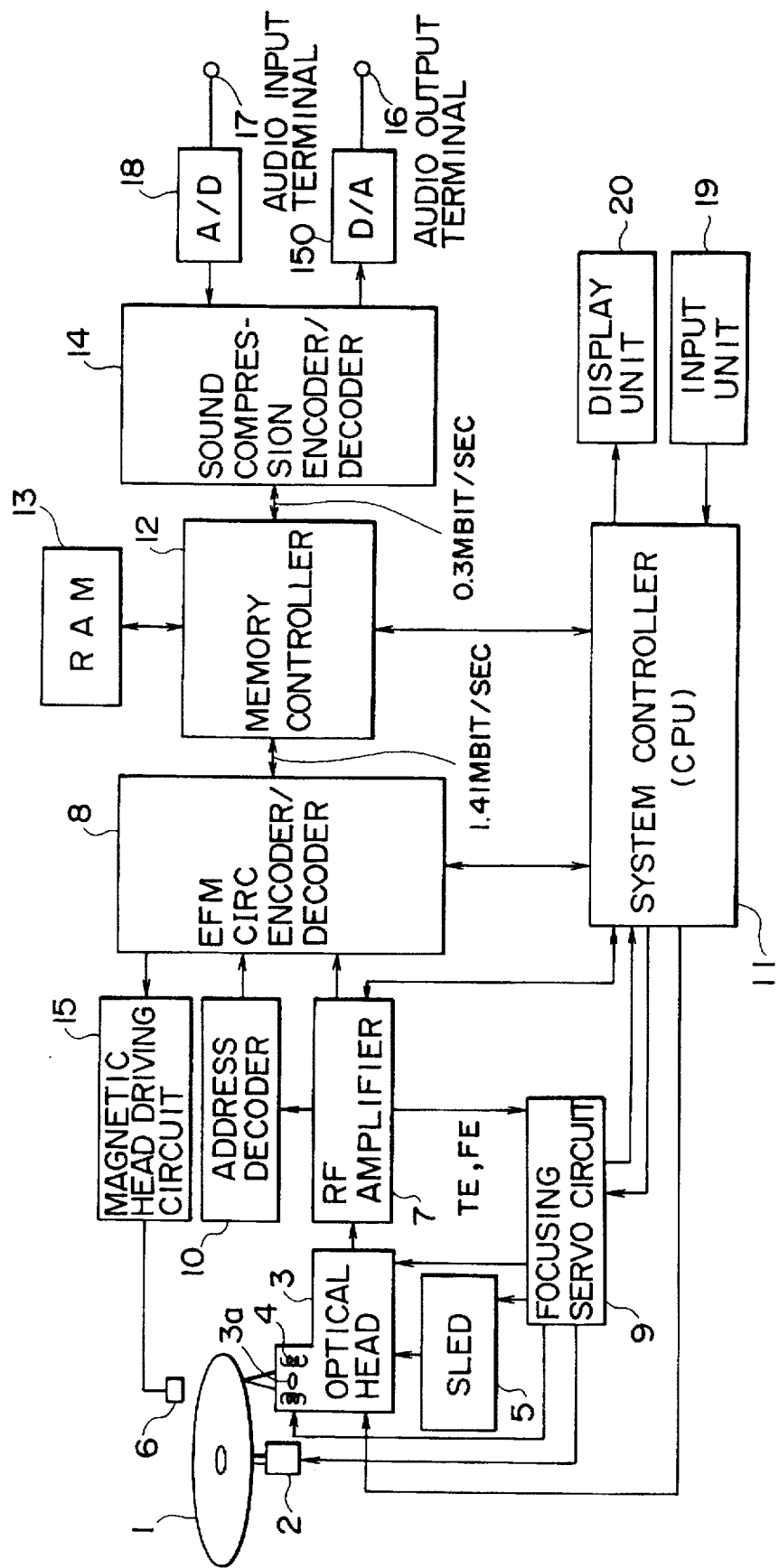
FIG. 4 is a block diagram of a recording/reproducing apparatus provided with a focusing servo system in accordance with the present invention.

Referring to FIG. 4 showing, in a block diagram, an optical recording/reproducing apparatus for recording information on or reproducing information from a magnetooptic disk (hereinafter referred to simply as "disk"), incorporating a focusing servo system in accordance with the present invention, there are shown a disk 1 which is driven for rotation by a spindle motor 2, an optical head 3 which scans the disk 1 for recording/reproducing operation with a high-level laser beam to heat the track at the Curie temperature when recording information on the disk 1 and with a low-level laser beam to reproduce data from the reflected laser beam by using magnetic Kerr effect.

When the disk 1 is a read-only optical disk on which data is recorded in pits, such as a compact disk, the optical head 3 provides reproduced RF signals corresponding to the variation of the intensity of the reflected light caused by the pits. A magnetic recording operation, which will be described later, is not performed for a read-only optical disk.

The optical head 3 for reading data from the disk 1 comprises an optical system including a laser diode, i.e., a light source, a deflecting beam splitter and an objective lens 3a, and a detector for detecting the reflected laser beam. The objective lens 3a is supported so as to be moved by an actuator in radial directions, i.e., tracking directions, and in directions away from and toward the disk 1, i.e., focusing directions. The optical head 3 is mounted on a sled mechanism 5 capable of radially moving the optical head 3. A magnetic head 6 for applying a perpendicular magnetic field modulated according to data to the disk 1 and the optical head 3 are disposed opposing to each other on opposite sides of the disk 1.

In the reproducing mode, the optical head 3 picks up information from the disk 1 and gives the same to an RF amplifier 7. Then, the RF amplifier processes the input information to extract a reproduced RF signal, a tracking error signal (TE), a focus error signal (FE), absolute position information, address information, subcode information, information about focus acquisition enable range (FOK signal) and such. The reproduced RF signal is given to an encoder/decoder 8. The tracking error (TE) signal and the focus error signal (FE) are given to a servo circuit 9. The FOK signal is given to a system controller 11. The absolute position information is represented by pregrooves preformatted on the optical disk 1, i.e., wobbled track marks. The servo circuit 9 generates servo drive signals on the basis of the input signals including the tracking error signal (TE) and the focus error signal (FE), and a track jump command, a seek command and rotating speed information given thereto by the system controller 11. The actuator 4 and the sled mechanism 5 are controlled by the servo drive signals for focusing and tracking. The system controller 11 controls the spindle motor 2 for operation at a constant angular velocity (CAV) or a constant linear velocity (CLV). The encoder/decoder 8 processes the reproduced RF signal for decoding, such as EFM (eight-to-fourteen modulation) or CIRC. A memory controller 12 writes the decoded reproduced RF signal into a buffer memory 13, i.e., a RAM, for temporary storage. As the optical head 3 reads data from the disk 1, and the reproduced RF signal is transferred from the optical head 3 to the buffer memory 13 intermittently at a rate of 1.41 Mbit/sec.

The reproduced data stored in the buffer memory 13 is read at a transfer rate of 0.3 Mbit/sec and given to the encoder/decoder 14. Then, the reproduced data is processed for decoding for audio compression, the decoded reproduced signal is converted into corresponding analog signals by a D/A converter 150, and the analog signals are supplied, for example, as output an R-audio signal and an L-audio signal through a terminal 16 to an amplifier.

Thus, the recording/reproducing apparatus writes the data read from the disk 1 in the buffer memory 13 intermittently at a high rate for temporary storage, reads the data at a low rate from the buffer memory 13 and provides output audio signals. Therefore, the output audio signals are not interrupted and are provided continuously even if the tracking servo system fails temporarily in correctly tracking the track.

The absolute position information obtained by decoding the signal representing the wobbled pregrooves or the recorded address information is transferred through the encoder/decoder 8 to the system controller 11, and then the system controller 11 carries out necessary control operations on the basis of the absolute position information or the address information.

Supposing that the disk 1 is a magnetooptic disk, when recording information signals on the disk 1, analog audio signals applied to a terminal 17 are converted into corresponding digital data by an A/D converter 18. The digital data is subjected to audio compression encoding by the encoder/decoder 14. The compressed audio recording data is written in the buffer memory 13 for temporary storage by the memory controller 12, and then the compressed audio recording data is read from the buffer memory 13 in predetermined timing and given to the encoder/decoder 8. Then, the encoder/decoder 8 processes the compressed audio recording data for CIRC or EFM and gives the encoded recording data to a magnetic head driving circuit 15. The magnetic head driving circuit 15 gives magnetic head drive signals to the magnetic head 6 according to the encoded recording data to apply a perpendicular magnetic field of N- or S-pole to the disk 1, while the system controller 11 applies control signals to the optical head 3 to make the optical head 3 emit a laser beam at a recording level.

In FIG. 4, indicated at 19 is an input unit provided with a plurality of keys to be operated by the operator and at 20 is a display unit provided with, for example, a liquid crystal display.

A TOC (table of contents) including data areas in which data, such as those of music, is recorded and data for managing unrecorded areas are recorded on the disk 1. When the disk 1 is loaded into the recording/reproducing apparatus or immediately before starting recording or reproducing operation, the system controller 11 provides signals to make the servo circuit 9 drive the spindle motor 2 and the optical head 3 to read data stored in the TOC area. The TOC data is transferred through the RF amplifier 7 and the encoder/decoder 8 to the memory controller 12, and then the memory controller 12 stores the TOC data in a predetermined area in the buffer memory 13 to use the same for controlling operations for recording information on and reproducing information from the disk 1.

Figure 6:
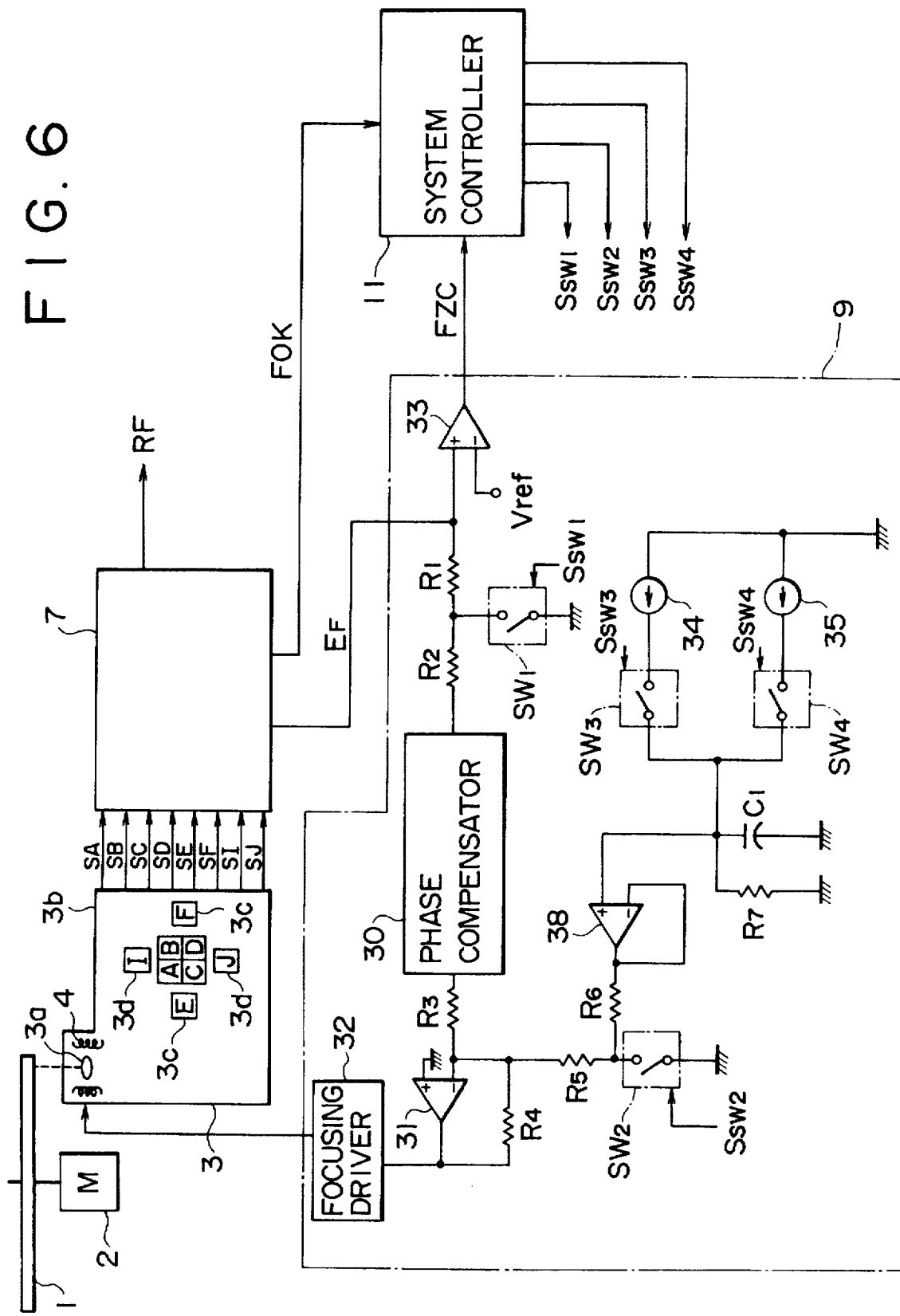
FIG. 6 is a block diagram of the focusing servo system in the first embodiment.

FIG. 6 shows a focusing servo system in a first embodiment according to the present invention incorporated into the foregoing recording/reproducing apparatus. FIG. 6 shows the optical head 3, the RF amplifier 7, the servo circuit 9 and the system controller 11 of FIG. 4 in detail. In FIG. 6, only the components of the focusing servo system are shown and the components of servo circuits for controlling the tracking system, the sled and the spindle are omitted.

Figure 1:
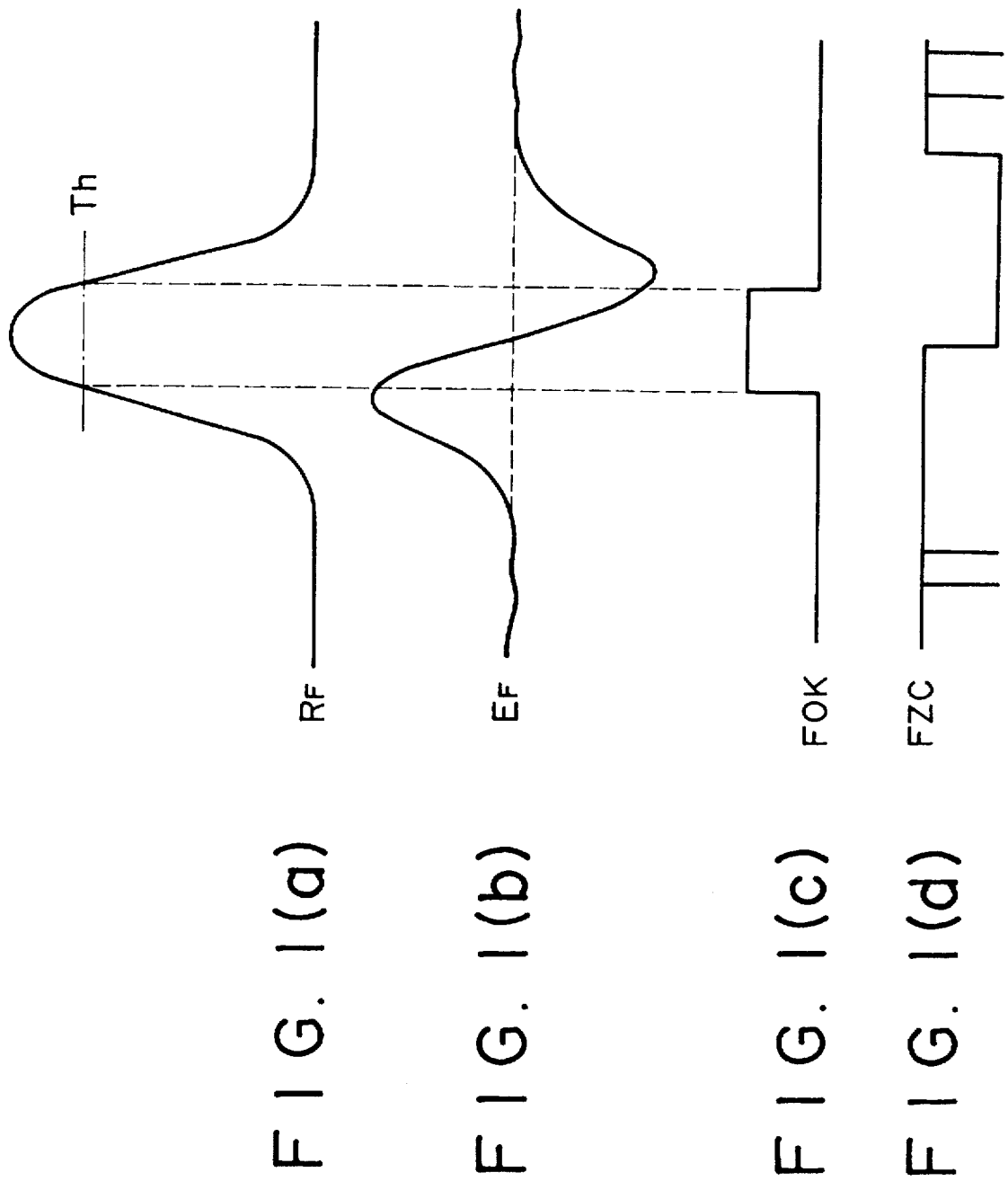
FIGS. 1(a) through 1(d) are diagrams of assistance in explaining a known focus search operation.
Figure 2:
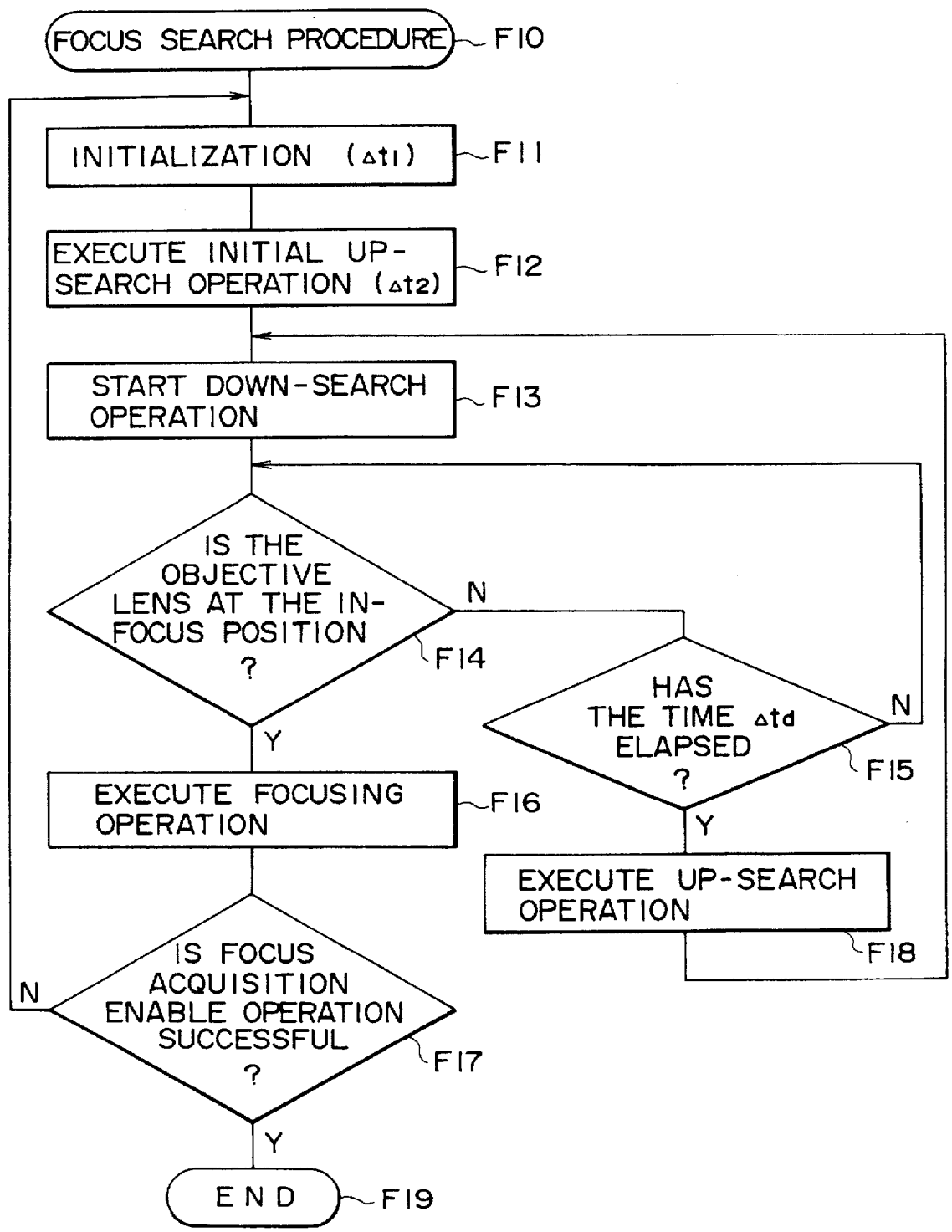
FIG. 2 is a flow chart of a known focus search procedure relevant to the present invention.

The optical head 3 is provided with a four-division detector 3b (A, B, C and D) for detecting the reflected beam, a side spot detector 3c (E and F) for detecting side spots and a detector 3d (I and J) for detecting magnetooptic data and pit data. Detection signals provided by the detectors 3b, 3c and 3d are given to the RF amplifier 7. The RF amplifier 7 generates a tracking error signal on the basis of the detection signals SE and SF provided by the side spot detector 3c. The RF amplifier 7 processes the detection signals SA, SB, SC and SD provided by the four-division detector 3b for the calculation of {(SA+SD)−(SB+SC)} to generate a focus error signal $E_F$ ($E_F$ corresponds to FE in FIG. 4.) The RF amplifier 7 processes the detection signals SI and SJ provided by the detector 3d to generate a RF signal. When reading the data recorded on the disk 1, the RF amplifier 7 calculates (SI−SJ) if the data recorded on the disk 1 is magnetooptic data, or calculates (SI+SJ) if the data recorded on the disk 1 is pit data. The RF amplifier 7 adds up the detection signals provided by the four-division detector 3b to obtain a sum signal (SA+SB+SC+SD), compares the sum signal with a given threshold to generate a FOK signal (FIG. 1(c)) corresponding to the difference between the sum signal and the threshold and gives the FOK signal to the system controller 11.

The focus error signal $E_F$ is transferred through resistors $R_1$ and $R_2$ to a phase compensator 30 for phase compensation. The output signal of the phase compensator 30 is transferred through a resistor $R_3$ to a differential amplifier 31, and the output signal of the differential amplifier 31 is given to a focusing driver 32. The output focusing drive signal of the focusing driver 32 is applied to the focusing coil of the actuator 4. A feedback resistor $R_4$ is connected to the differential amplifier 31.

The foregoing signal loop is a focusing servo loop that functions for focusing servo operation when a switch $SW_1$ is in the off-state. The feedback loop for focusing servo operation is opened when the switch $SW_1$ is in the on-state to disable the focusing servo loop from the focusing servo operation. The focus error signal $E_F$ is applied also to the input of a comparator 33, and then the comparator 33 compares the focus error signal $E_F$ with a reference voltage $V_{ref}$ and gives a FZC signal to the system controller 11.

A current source 34 supplies a driving current for driving the objective lens 3a for movement toward the recording surface of the disk 1 for an up-search operation during the focus search operation. A current source 35 supplies a driving current for driving the objective lens 3a for movement away from the recording surface of the disk 1 for down-search operation during the focus search operation. The current sources 34 and 35 are connected respectively through switches $SW_3$ and $SW_4$ to a time constant circuit consisting of a time constant capacitor $C_1$ and a time constant resistor $R_7$. The output of the time constant circuit is connected to a differential amplifier 38, and the output of the differential amplifier 38 is transferred through resistors $R_6$ and $R_5$ to the differential amplifier 31. When a switch $SW_2$ is in the off-state, the driving currents supplied by the current sources 34 and 35 are applied through the focusing driver 32 to the focusing coil of the actuator 4. The switches $SW_1$ to $SW_4$ are controlled for on-off operation respectively by switch control signals $S_{sw1}$ to $S_{sw4}$ provided by the system controller 11.

The focusing servo system in this embodiment is comprised of the focusing servo circuit 9 shown in FIG. 6, and the control functions of the system controller 11 connected to the servo control circuit 9.

The principle of operation of the focusing servo systems in the first embodiment and a second embodiment according to the present invention will be described hereinafter with reference to FIGS. 5(a) and 5(b). Search voltage having a predetermined waveform is applied to the focusing coil of the actuator 4 to supply a search current to the focusing coil so that objective lens is moved from a near position, i.e., a position nearest to the recording surface of the disk 1, toward a far position, i.e., a position farthest from the recording surface of the disk, during the focus search operation. Practically, it often occurs, particularly, when the recording/reproducing apparatus is used on an automobile, that the objective lens is caused to move by external vibrations or shocks applied to the recording/reproducing apparatus regardless of the search voltage. Supposing that a search voltage having a waveform as shown in FIG. 5(a) is applied to the focusing coil of the actuator 4, the position of the objective lens should vary as indicated by broken lines in FIG. 5(b). Nevertheless, it often occurs that the position of the objective lens is caused to vary randomly as indicated by an irregular continuous line in FIG. 5(b) by external vibrations or the like, which is most probable with an automotive disk player. Supposing that the position indicated by an alternate long and short dash line is the in-focus position of the objective lens, the moment when the objective lens passes the in-focus position is an opportunity for executing a focus acquisition enable operation. If the position of the objective lens varies randomly as shown in FIG. 5(b), the irregular continuous line crosses the alternate long and short dash line many times and hence the opportunity for focus acquisition enable operation arises frequently regardless of the waveform of the search voltage. Therefore, when the focusing servo system is capable of carrying out the focus acquisition enable operation every time the opportunity arises, the focusing servo system is able to restart the focus acquisition enable operation immediately after the focus acquisition enable operation has failed.

The focus search operation of the focusing servo system in the first embodiment will be described hereinafter with reference to FIGS. 7(a) to 7(b), 8(a) to 8(d) and 9(a) to 9(d).

Figures 7, 7A:
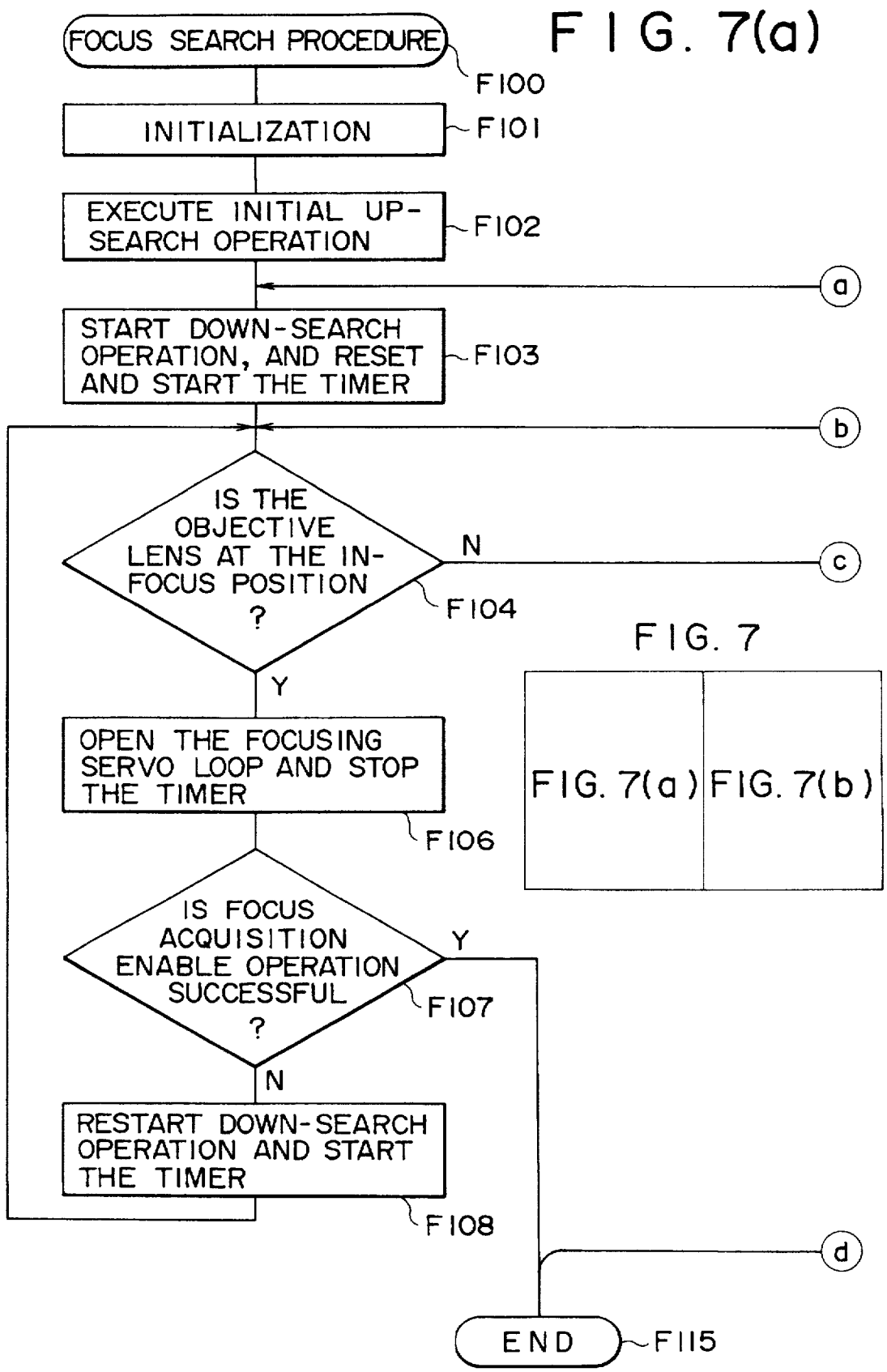
FIGS. 7(a) through 7(b) are a flow chart of a focus search procedure to be executed by the focusing servo system in the first embodiment.
Figure 7B:
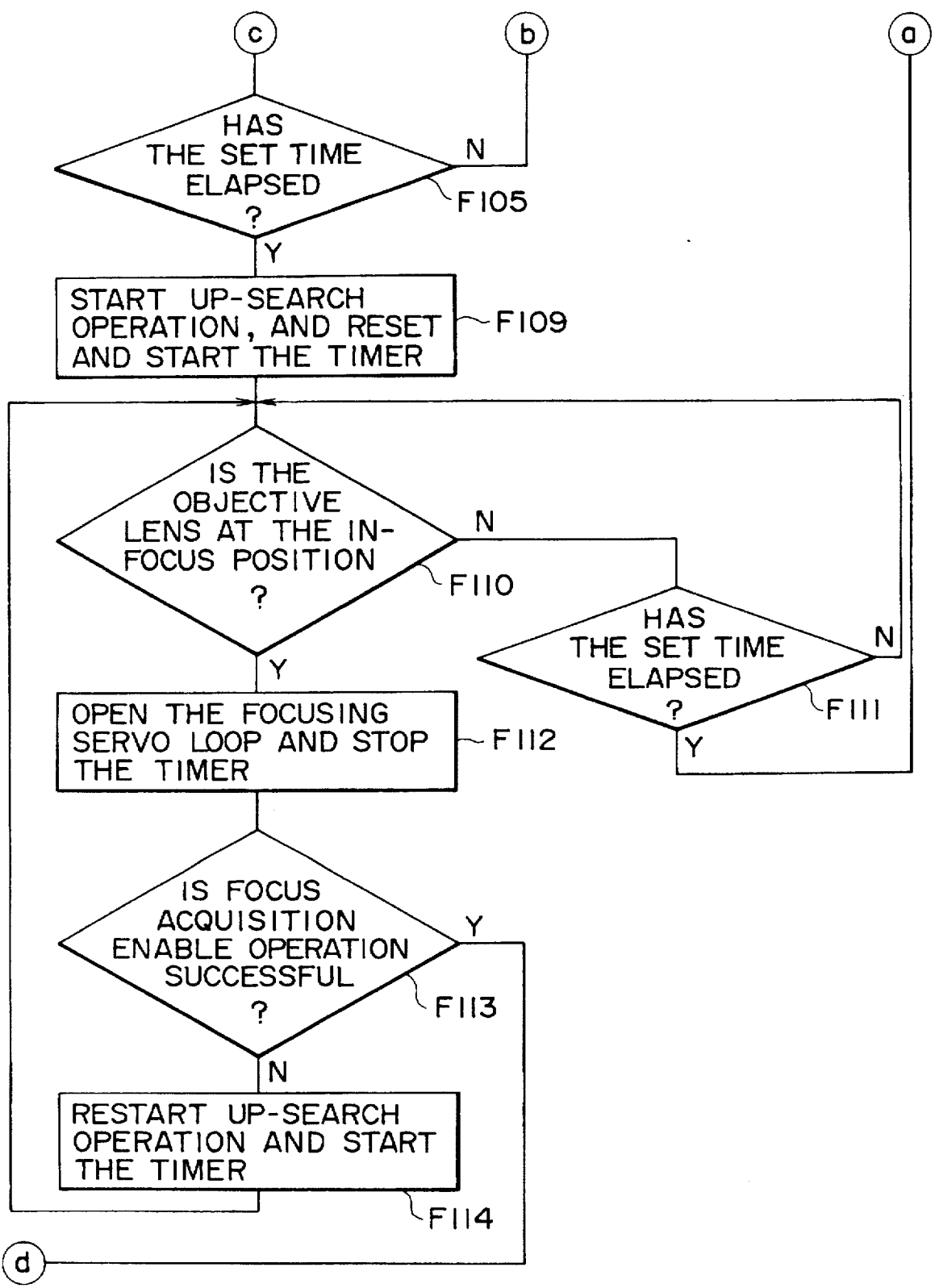
Figure 10B:
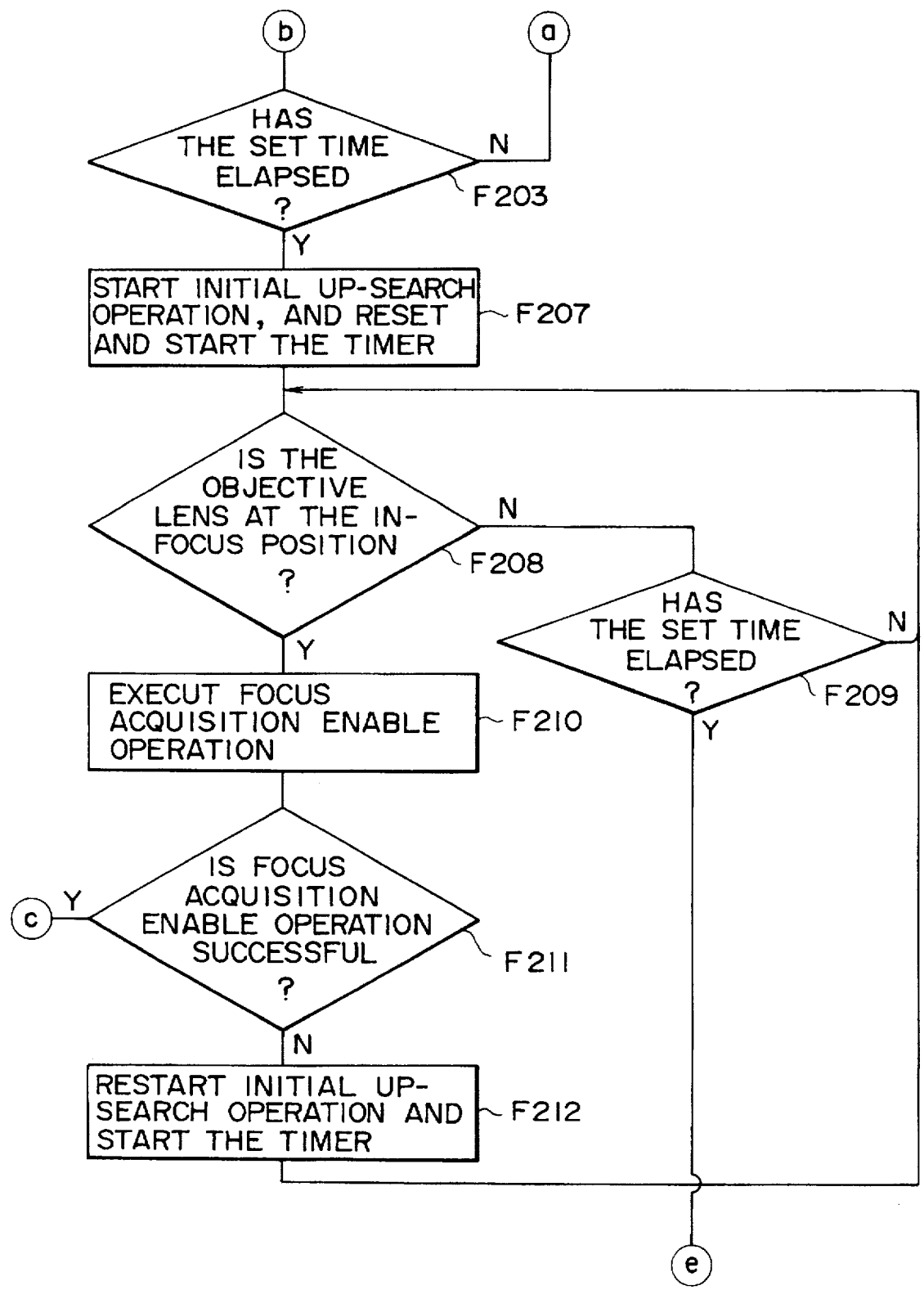
Figure 10C:
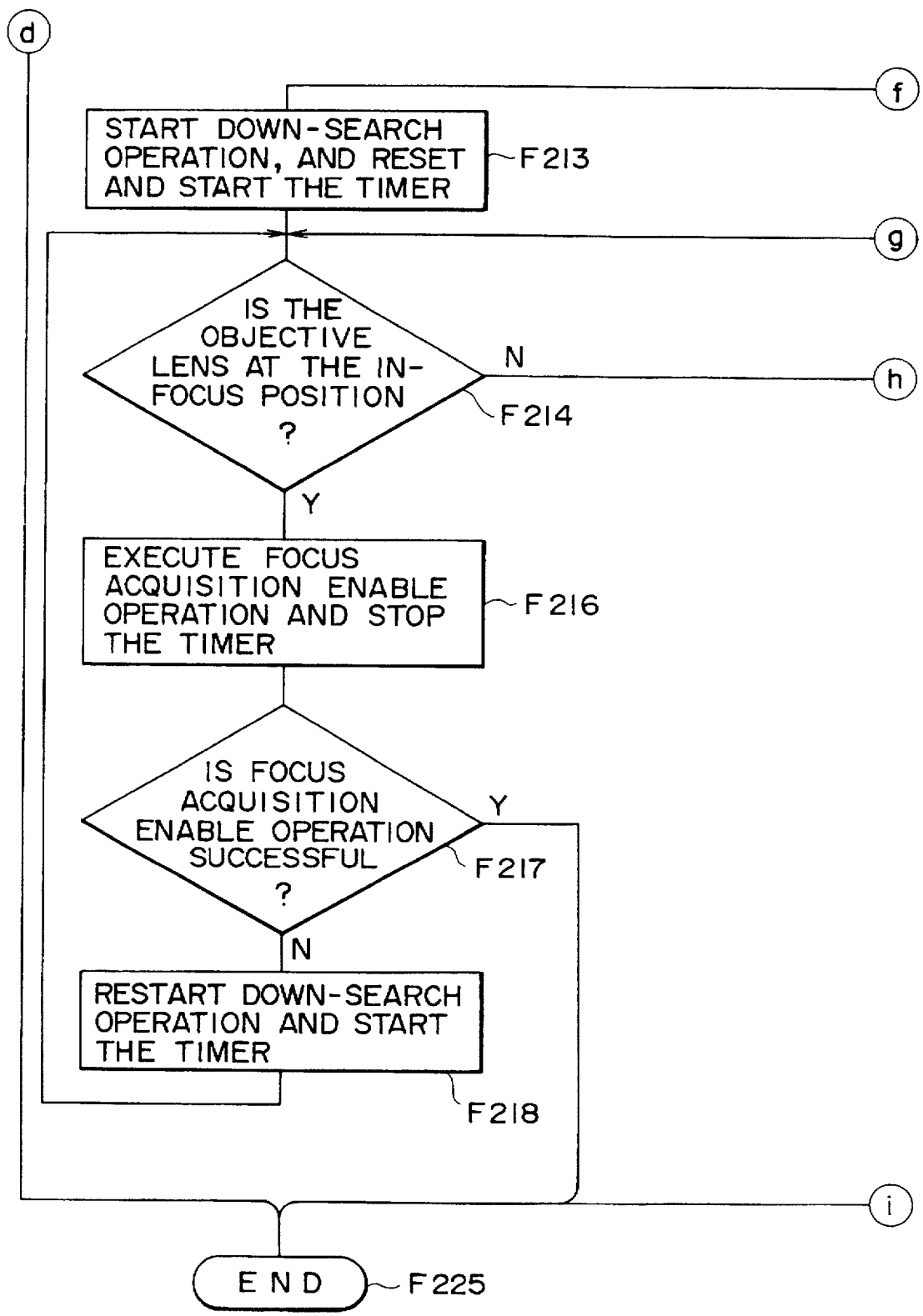
Figure 10D:
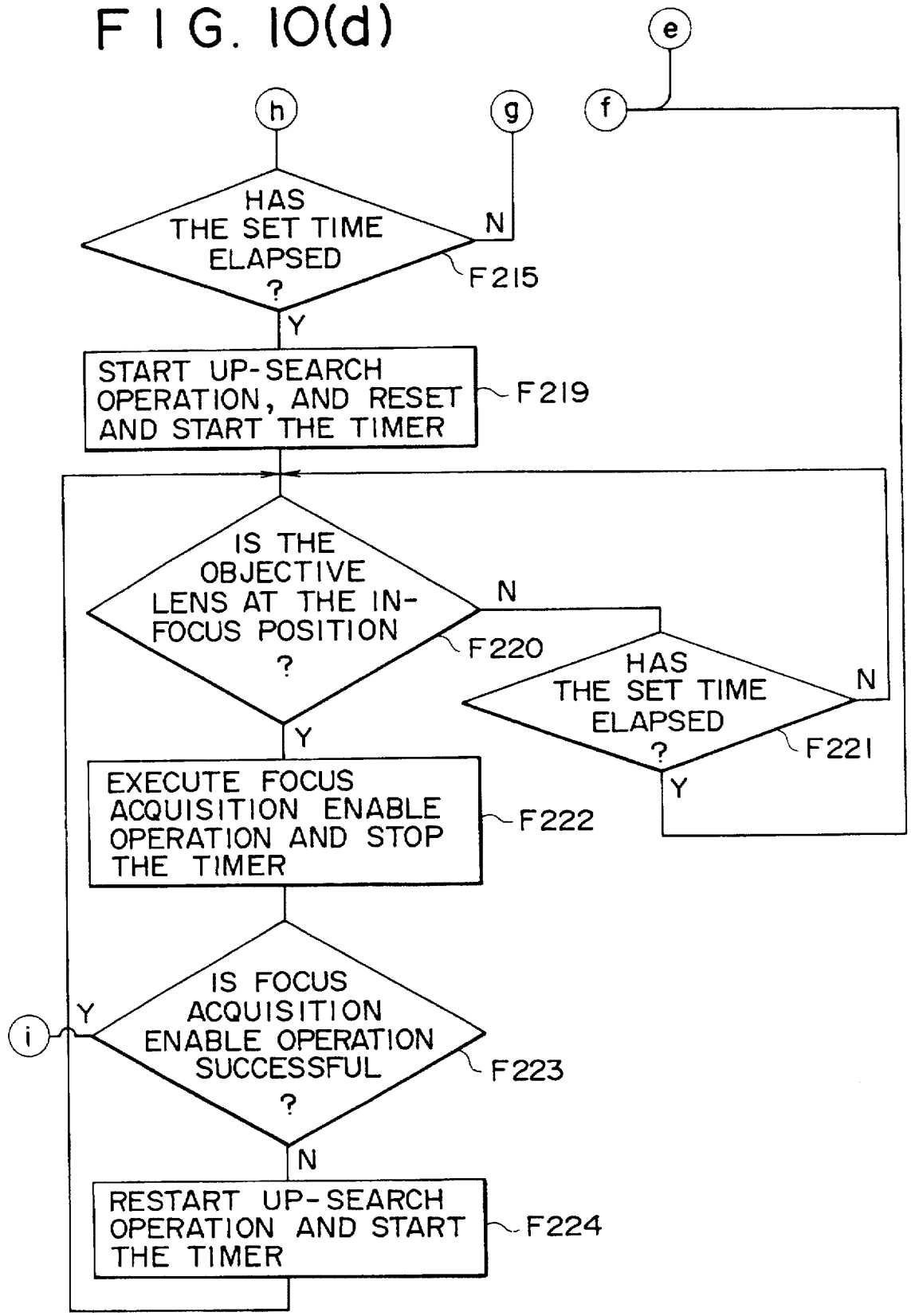

FIGS. 7(a) to 7(b) show a control procedure to be executed by the system controller 11 to control the focusing servo circuit 9 for focus search operation. FIGS. 8(a) and 9(a), FIGS. 8(b) and 9(b), FIGS. 8(c) and 9(c), and FIGS. 8(d) and 9(d) show the waveforms of the search voltage, FOK signals, FZC signals, and variation of the position of the objective lens due to the combined effect of the search voltage and external vibrations, respectively.

Referring to FIGS. 7(a to 7(b) and 8(a) to 8(d), upon the start of the focus search operation in step F100, the system controller 11 turns on the switch $SW_1$ to open the focusing servo loop and turns off the switch $SW_2$ for initialization in step F101 in a time period $\Delta t_1$. In step F102, the switch $SW_3$ is turned on to supply an up-search current from the current source 34 to the focusing coil of the actuator 4 for a time period $\Delta t_2$ to move the objective lens 3a for an initial up-search operation.

Then, in step F103, the system controller 11 turns off the switch SW$_3$, turns on the switch SW$_4$ to supply a down-search current from the current source 35 to the focusing coil of the actuator 4 for a down-search time ($\Delta t_d$ in FIG. 5(a)) to move the objective lens 3a for a down-search operation, resets and starts a timer to time the down-search time.

During the down-search movement of the objective lens 3a, a loop of steps F104 and F105 for detecting the FOK signal and the FZC signal is repeated until FOK indicates that the position of the objective lens 3a coincide with the in-focus position. Upon the coincidence of the position of the objective lens 3a with the in-focus position, the system controller 11 turns off the switch SW$_1$, turns on the switch SW$_2$ to open the focusing servo loop and stops the timer in step F106. If FCZ indicates that the focus acquisition enable operation is completed successfully (time T$_4$ in FIG. 8(a)), i.e., the response to query in step F106 is affirmative, the control procedure goes to step F115 to terminate the focusing servo operation.

FIGS. 9(a) to 9(d) show a mode of the focus search operation when the system controller 11 fails at time T$_4$ in the focus acquisition enable operation. The focus acquisition enable operation results in failure when FZC indicates that the focus acquisition enable operation could not position the objective lens 3a at the in-focus position or when the objective lens 3a is positioned at a false in-focus position.

Since the light beam projected on the disk 1 is reflected by both the surface of the recording film and the protective film underlying the recording film, the reflected light beam reflected by the protective film forms an S-curve having an amplitude smaller than an S-curve formed by the reflected light reflected by the recording film. However, if the RF amplifier 7 is provided with an AGC circuit, these S-curves are substantially the same in amplitude and, consequently, a false in-focus position is detected.

When the focus acquisition enable operation results in failure due to a faulty servo operation, the FOK signal goes LOW. When the servo operation is started for a false in-focus position, data cannot be read thereafter. The system controller 11 detects the state in which data reading is impossible from a monitor signal (GFS signal) provided by the encoder/decoder 8 and indicating irregularity in the frame synchronizing signal.

When it is determined at step F107 that the focus acquisition enable operation has resulted in failure, the procedure goes to step F108 to restart the down-search operation and the timer for timing the down-search time is restarted. Thus, the procedure does not return to step F101, but starts the focus search operation from the step F104 in which the focus acquisition enable operation is started.

Although the down-search operation is thus repeated until the in-focus position is detected, the objective lens 3a is caused to move by external vibrations or the like as explained in connection with FIGS. 5(a) and 5(b) regardless of the waveform of the search voltage. Therefore, it sometimes occurs that the objective lens 3a is moved to the in-focus position after the focus search operation has been started. For example, in FIGS. 9(a) to 9(d), the down-search operation is started at time T$_{20}$ and the objective lens 3a is at the in-focus position at time T$_{21}$. Upon the detection of the in-focus state at time T$_{21}$, the focus acquisition is executed again in step F106. If the focus acquisition enable operation is achieved successfully, i.e., the response to a query in step F107 is affirmative, the procedure goes to step F115 to terminate the focus search operation. Thus, even if focus acquisition enable operation has resulted in failure, the focus search operation is restarted from a state immediately before the detection of failure, and the focus acquisition enable operation is carried out again at an opportunity for focus acquisition enable operation that arises immediately after the restart of the focus search operation.

In case the time period $\Delta t_d$ for down-search operation has elapsed before the in-focus position is detected, i.e., if the response to a query in step F105 is affirmative, the up-search operation is started in step F109, in which the system controller 11 turns off the switch SW$_3$, turns on the switch SW$_4$ to supply an up-search current to the focusing coil of the actuator 4, and resets and starts a timer for timing an up-search time. Then, a loop of steps F110 and F111 is executed to detect the in-focus position until the in-focus position is detected. Upon the detection of the in-focus position, the timer is stopped and the focus acquisition enable operation is executed in step F112. If it is decided in step F113 that the focus acquisition enable operation is completed successfully, the procedure goes to step F115 to terminate the focus search operation. In case the focus acquisition enable operation is unsuccessful, the up-search operation is restarted in step F114 from the the state immediately before the start of the focus acquisition enable operation and the timer is restarted to repeat the loop of steps F110 and F111. In case the up-search time (the time $\Delta t_u$ in FIG. 5(a)) has elapsed before the in-focus position is detected, i.e., if the response to a query in step F11 is affirmative, the procedure returns to step F103 to start the down-search operation again.

Thus, the focusing servo system uses an opportunity for focus acquisition enable operation most effectively to repeat the focus acquisition enable operation in case the focus acquisition enable operation is unsuccessful. Supposing that the time necessary for detecting failure in focus acquisition enable operation is 5 msec, an opportunity for the focus acquisition enable operation that arises 5 msec or longer, which is far shorter than the time (1000 to 1200 msec) necessary to elapse before the next focus acquisition enable operation can be started in carrying out the focus search operation previously described with reference to FIGS. 2 and 3(a) to 3(c), after the detection of failure in focus acquisition enable operation is the first opportunity for the next focus acquisition enable operation. Therefore, even if the focus acquisition enable operation is unsuccessful, the focus search operation can be repeated at comparatively short time intervals and hence interruption of the reproduced sound due to delay in the successful completion of focus search operation rarely occurs.

A focusing servo system in a second embodiment according to the present invention will be described hereinafter with reference to FIGS. 10(a) to 10(d) and 11(a) to 11(d).

The focusing servo system in the second embodiment is capable of achieving the focus search operation more quickly than the focusing servo system in the first embodiment. The focusing servo system in the second embodiment starts a focus search operation for detecting the in-focus position in the initializing stage in a period between times T$_1$ and T$_3$ (FIG. 5(a)).

Referring to FIGS. 10(a) to 10(d), upon the start of the focus search operation in step F200, the detection of the in-focus position is executed in steps F202 and F203 on the basis of the FOK signal and the FZC signal. Once the in-focus position is detected, the focusing servo loop is closed to execute the focus acquisition enable operation in step F204. If it is decided in step F205 that the focus acquisition enable operation is completed successfully, the procedure goes to step F225 to terminate the focus search operation. If the focus acquisition enable operation is unsuccessful, the initialization is executed again in step F206. If the focus acquisition enable operation could not be achieved during initialization, an initial up-search operation is executed in step F207 to detect the in-focus position in steps F208 and F209. If the response to a query made in step F208 to see if the in-focus position is detected is affirmative, the focusing servo loop is closed to execute the focus acquisition enable operation in step F210. When it is decided in step F211 that the focus acquisition enable operation is completed successfully, the procedure goes to step F225 to terminate the focus search operation. If the focus acquisition enable operation is unsuccessful, the initial up-search operation is restarted in step F212.

In some cases, the objective lens 3a is caused to pass the in-focus position by external vibrations or the like in the stage of initialization or initial up-search operation. Since the focusing servo system in the second embodiment is able to take such an opportunity for the execution of the focus acquisition enable operation, the focusing servo system is able to achieve the focus search operation very quickly when such an opportunity is taken. For example, as shown in FIGS. 11(a) to 11(d), the objective lens 3a is at the in-focus position at time $T_{31}$ during initialization, and the focus acquisition enable operation is executed at time $T_{31}$. Steps F213 to F224 in FIG. 10 are the same as steps F103 to F114 in FIG. 7 and hence the description thereof will be omitted.

The present invention can be embodied in various forms other than the first and the second embodiment. For example, the focus acquisition enable operation may be executed only during the down-search operation or during the up-search operation. It is also possible to execute the conventional focus search operation in the initial stage and to execute step F103 and the following steps after a predetermined time has elapsed and the focus acquisition enable operation has resulted in failure during the predetermined time. It is also possible not to supply any search current to the focusing coil of the actuator 4 in order that the objective lens is not moved positively to leave the movement of the objective lens 3a to the objective lens driving effect of external vibrations, and to execute the focus acquisition enable operation when the objective lens 3a is moved to the in-focus position by the external vibrations.

A focusing servo system in a third embodiment according to the present invention will be described hereinafter with reference to FIG. 12, in which parts like or corresponding to those of the focusing servo system in the first embodiment shown in and previously described with reference to FIG. 6 are denoted by the same reference characters, and the illustration and the tracking servo circuit, the sled driving servo circuit and the spindle driving servo circuit of the focusing servo system in the third embodiment will be omitted.

Figure 12:
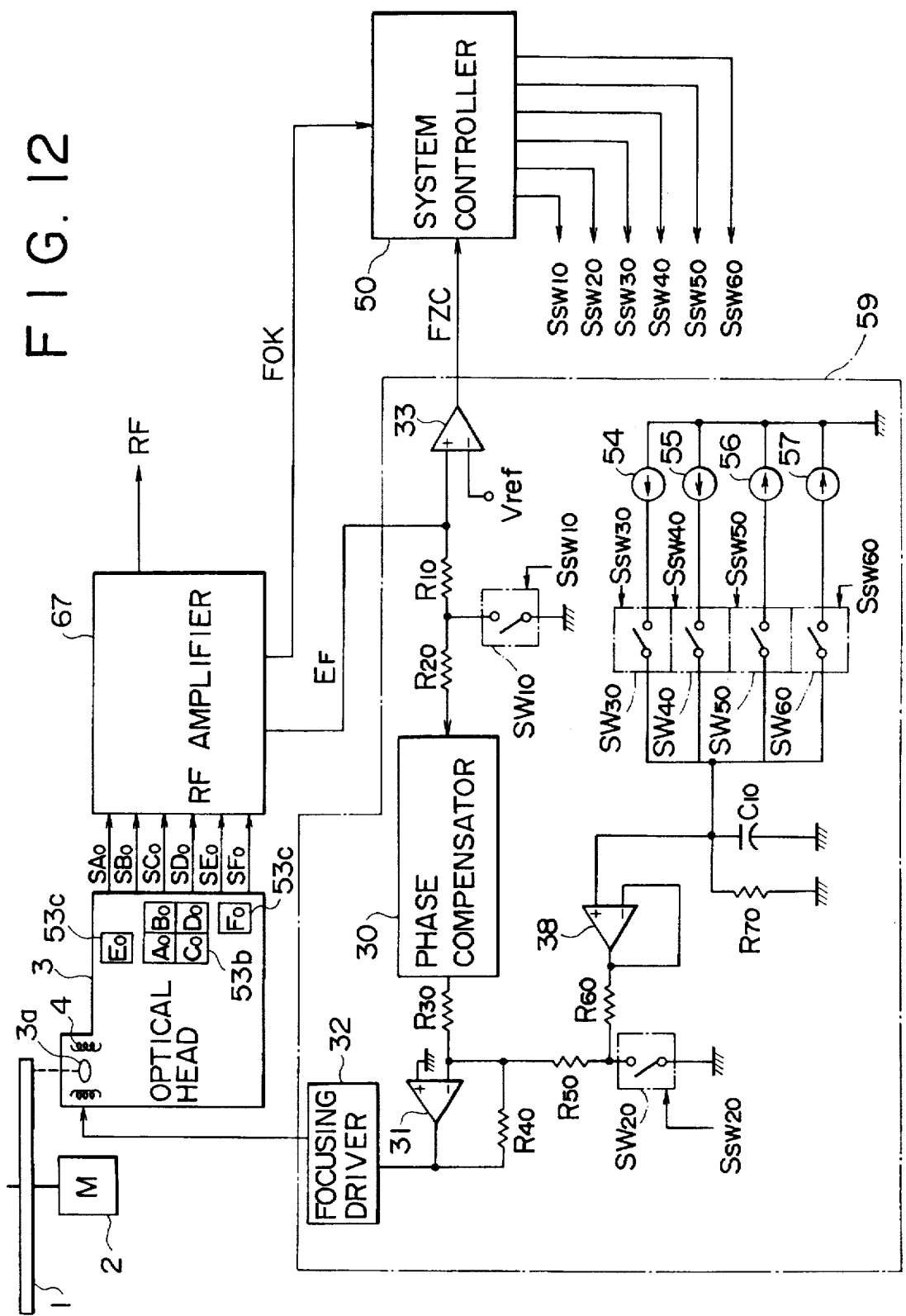

Referring to FIG. 12, an optical head 3 is provided with a four-division detector 53b ($A_0$, $B_0$, $C_0$ and $D_0$) for detecting the reflected light beam and a side spot detector 53c ($E_0$ and $F_0$) for detecting a side spot. A RF amplifier 67 generates a tracking error signal on the basis of the output detection signals $SE_0$ and $SF_0$ of the side spot detector 53c. The RF amplifier 67 processes the output detection signals $SA_0$, $SB_0$, $SC_0$ and $SD_0$ of the four-division detector 53b for the calculation of $\{(SA_0+SD_0)-(SB_0+SC_0)\}$ to generates a focus error signal $E_F$. The RF amplifier 67 compares a signal $(SA_0+SB_0+SC_0+SD_0)$ obtained by processing the output detection signals $SA_0$, $SB_0$, $SC_0$ and $SD_0$ of the four-division detector 53b and a predetermined threshold to generate a FOK signal (FIGS. 1(a) to 1(d)), and gives the FOK signal to a system controller 50. The focus error signal $E_F$ is transferred through resistors $R_{10}$ and $R_{20}$ to a phase compensator 30 included in a servo circuit 59 for phase compensation. The output signal of the phase compensator 30 is transferred through a resistor $R_{30}$ and a differential amplifier 31 to a focusing driver 32, and then a focusing drive signal provided by the focusing driver 32 is applied to the focusing coil of an actuator 4. Indicated at $R_{40}$ is a feedback resistor connected to the differential amplifier 31. This signal loop serves as a focusing servo loop, which functions to enable a focusing servo operation when a switch $SW_{10}$ is in the off-state. When the switch $SW_{10}$ is turned on, a feedback loop for the focusing servo loop is opened to stop the focusing servo operation. A comparator 33 compares the focus error signal $E_F$ and a reference voltage $V_{ref}$ and generates a FZC signal and gives the FZC signal to the system controller 50.

During a focus search operation, a current source 54 supplies a driving current for moving the objective lens 3a of the optical head 3 toward the recording surface of a disk 1 at a comparatively low velocity, a current source 55 supplies a driving current for moving the objective lens 3a toward the recording surface of the disk 1 at a comparatively high velocity, a current source 56 supplies a driving current for moving the objective lens 3a away from the recording surface of the disk 1 at a comparatively low velocity, and a current source 57 supplies a driving current for moving the objective lens 3a away from the recording surface of the disk 1 at a comparatively high velocity. The current sources 54, 55, 56 and 57 are connected respectively through switches $SW_{30}$, $SW_{40}$, $SW_{50}$ and $SW_{60}$ to a time constant circuit consisting of a time constant capacitor $C_{10}$ and a time constant resistor $R_{70}$. The output signal of the time constant circuit is transferred through a differential amplifier 38 and resistors $R_{60}$ and $R_{40}$ to a differential amplifier 31. While a switch $SW_{20}$ is turned on, the driving current supplied by the current source 54, 55, 56 or 57 through a focusing driver 32 to the focusing coil of the actuator 4. The switches $SW_{10}$ to $SW_{60}$ are controlled for on-off operation by switch control signals $S_{sw10}$ to $S_{sw60}$ provided by the system controller 50. One of the switches $SW_{30}$ to $SW_{60}$ is turned on selectively for focus search operation.

The focusing servo system in the third embodiment is comprised of the focusing servo circuit 59 shown in FIG. 12 and the control functions of the system controller 50 for controlling the focusing servo circuit 59.

A focus search operation to be carried out by the focusing servo system in the third embodiment will be described hereinafter with reference to FIGS. 13(a)–(b), 14, 15(a) to 15(c) and 16(a) to 16(c).

The focusing servo system executes the focus search operation selectively in either a high-speed search mode or a low-speed search mode. First, the focus search operation in the high-speed search mode will be described in connection with steps F301 to F309 of FIG. 13(a)–(b), and FIG. 14. In the following description, "up" is used to modify movement or direction toward the recording surface of the disk 1 and "down" is used for modifying movement or direction away from the recording surface of the disk 1.

Figure 13A:
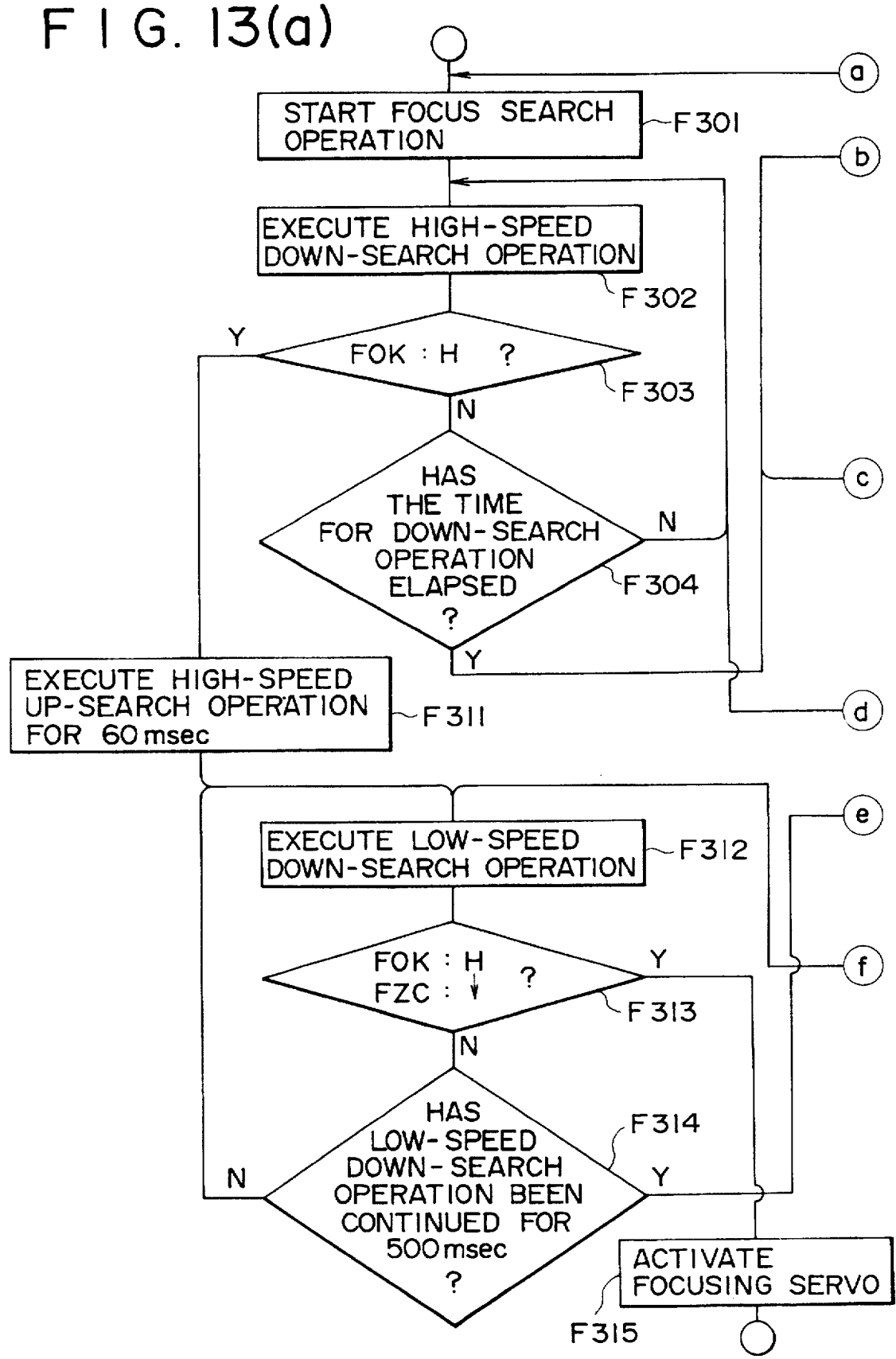
Figure 13B:
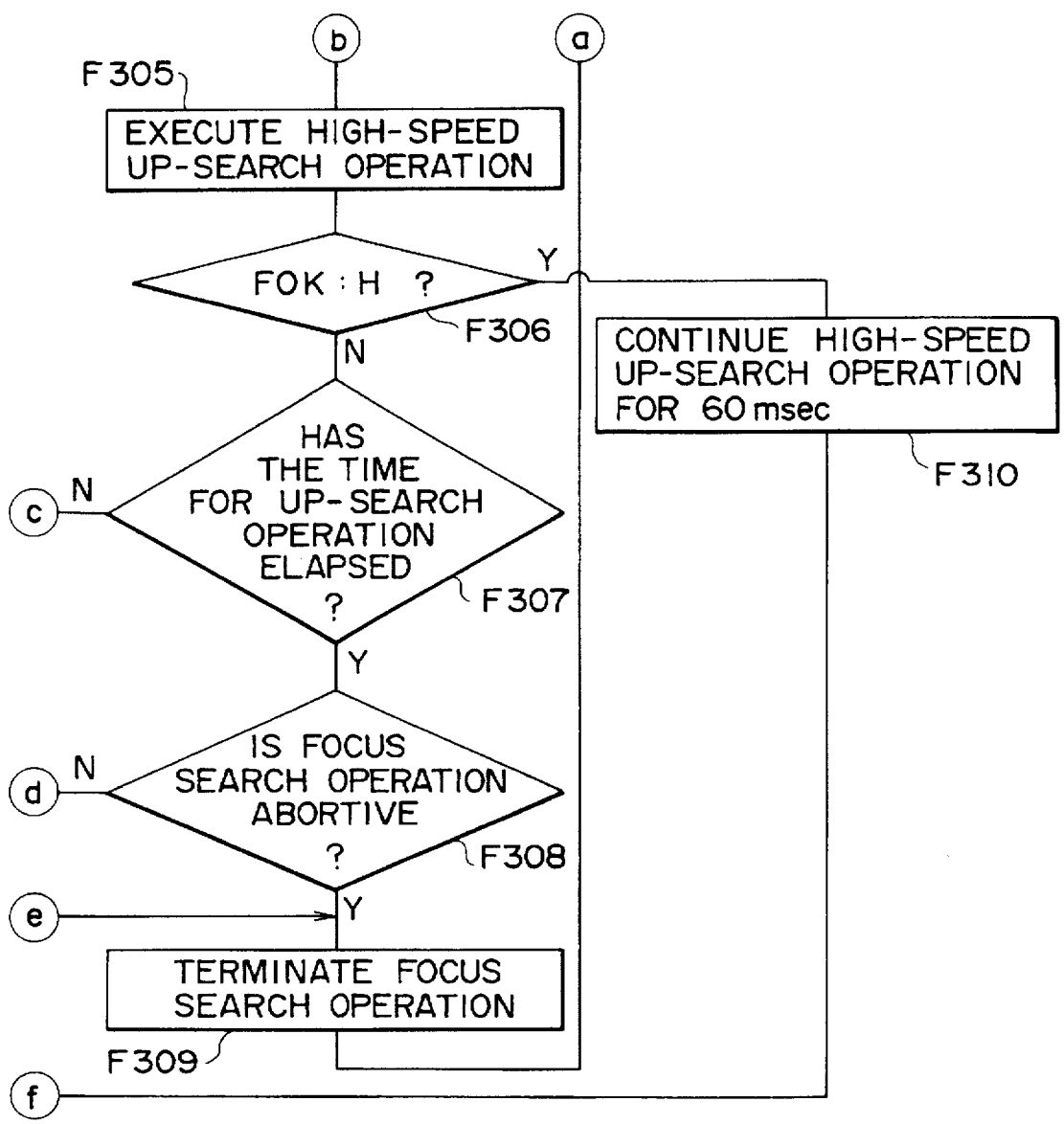
Figure 13:
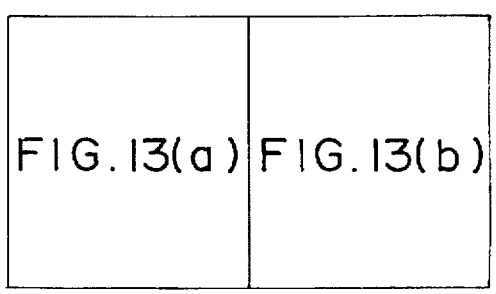
Figure 14:
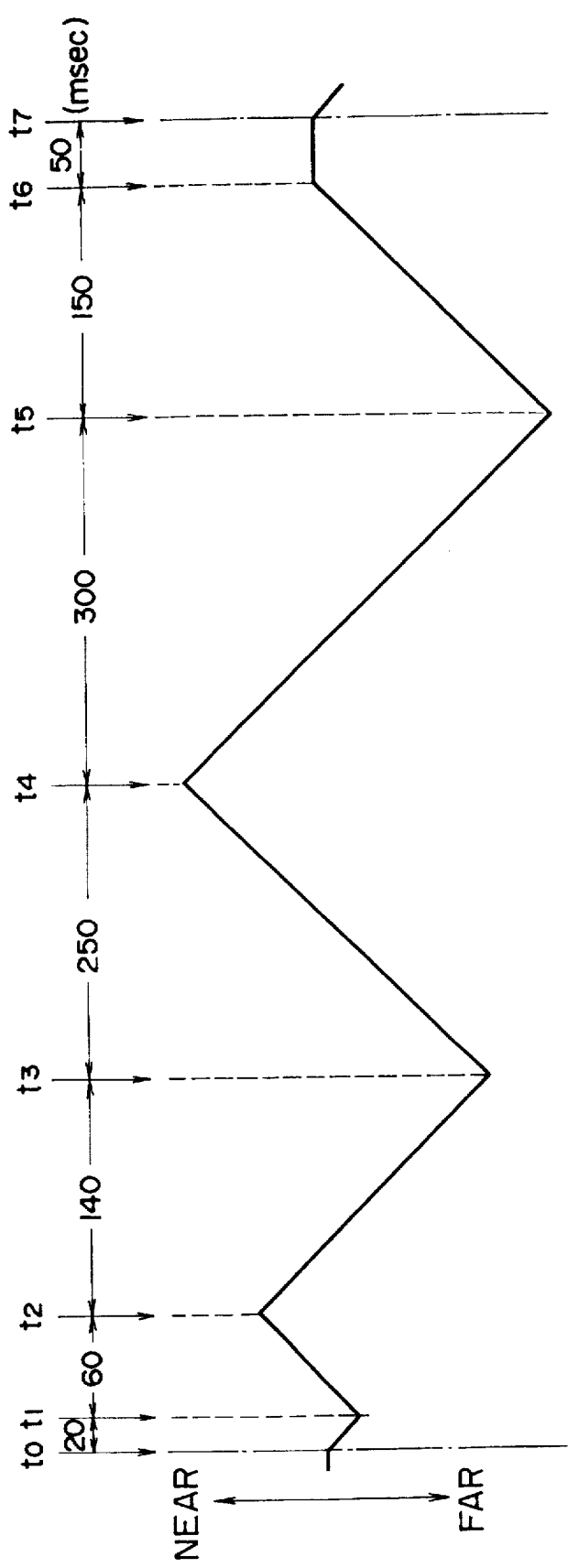
FIG. 14 is a diagram of assistance in explaining a first search operation of the focusing servo system in the third embodiment.

Referring to FIGS. 13(a)–(b), and 14, a focus search operation is started in step F301 to execute the first stage of a focus search procedure, then, in step F302, the system controller 50 turns on the switch $SW_{10}$ to open the focusing servo loop, turns off the switch $SW_{20}$ and turns on the switch $SW_{60}$ to supply a current from the current source 57 to the focusing coil of the actuator 4 to execute a high-speed down-search operation. Supposing that the focus search operation is started at time to (FIG. 14), the high-speed down-search operation is continued for 20 msec till time $t_1$ in a loop of steps F302→F303→F304→F302. If the FOK signal goes HIGH in step F303, the second stage of the focus search procedure, which will be described later, is executed.

At time $t_1$, i.e., the end of the time interval of 20 msec for the high-speed down search operation, the system controller 50 turns off the switch $SW_{60}$ and turns on the switch $SW_{40}$ to supply a current from the current source 55 to the focusing coil of the actuator for a high-speed up-search operation (F304, F305). The high-speed up-search operation is continued for 60 msec till time $t_2$ in a loop from step F305 through steps F306 and F307 to step F305. If the FOK signal goes HIGH in step F306, the second stage of the focus search procedure is executed. At time $t_2$, i.e., the end of the time interval of 60 msec for the high-speed up-search operation, the high-speed down-search operation is restarted (F307→F308→F302).

As shown in FIG. 14, in the first focus search procedure including steps F301 to F309, a 20 msec high-speed down-search operation, a 60 msec high-speed up-search operation, a 140 msec high-speed down-search operation, a 250 msec high-speed up-search operation, a 300 msec high-speed down-search operation and a 150 msec high-speed up-search operation are executed successively. If the FOK signal does not go HIGH until the end of the 150 msec high-speed up-search, i.e., till time $t_6$ (FIG. 14), it is decided that the first stage of the focus search operation is abortive, and then the focus search operation is restarted (F308→F309→F301).

Steps F304 and F307 are described elliptically in FIGS. 13(a)–13(b); actually, the predetermined time in step F304 is 20 msec for the first high-speed down search operation, 140 msec for the second high-speed down-search operation or 300 msec for the third high-speed down-search operation, and the predetermined time in step F307 is 60 msec for the first high-speed up-search operation, 250 msec for the second high-speed up-search operation or 150 msec for the third high-speed up-search operation.

Figure 18:
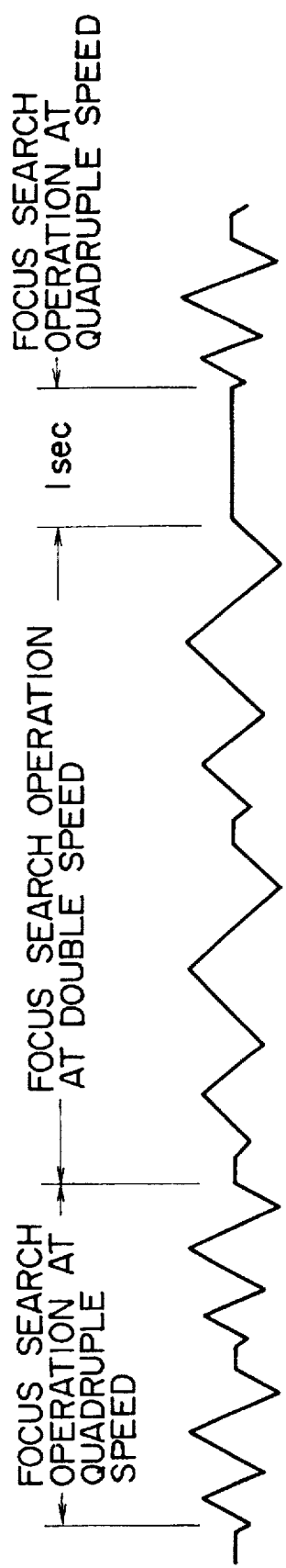
FIG. 18 is a diagram of assistance in explaining the first search operation of the focusing servo system in the third embodiment.

When the focus search operation is started again after the first stage of the focus search procedure has resulted in failure, the searching speed is reduced for a predetermined cycle of the focus search operation as shown in FIG. 18. For example, when the searching speed for the second stage of the focus searching procedure is S, the searching speed is reduced from 4S to 2S.

During the high-speed search operation in the first stage of the focus search procedure, actually, the FOK signal goes HIGH before time $t_6$ (FIG. 14) where it is decided that the focus search operation is abortive, and the second stage of the focus search procedure is started (F311, F312; F306, F312). The searching speed for the second stage of the focus search procedure is lower than that for the first stage of the focus search procedure such that the objective lens can be surely positioned at the in-focus position; the searching speed for the second stage is approximately equal to the searching speed in the focus search operation carried out by the focusing servo circuit of FIG. 2.

Figures 15A, 15B, 15C:
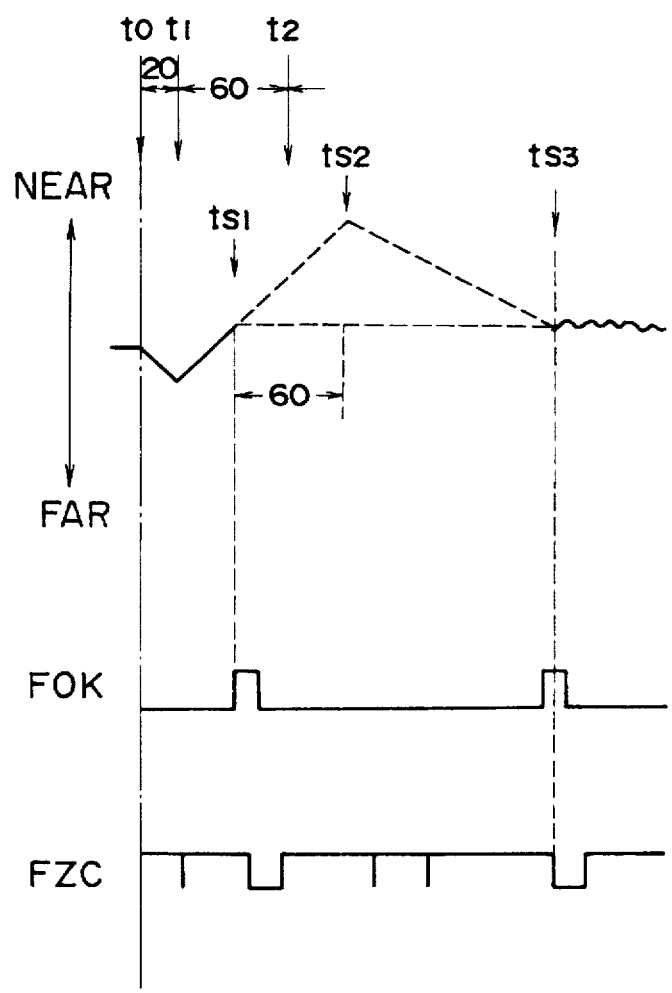
FIGS. 15(a) through 15(c) are diagrams of assistance in explaining the focus search operation of the focusing servo system in the third embodiment.
Figures 16A, 16B, 16C:
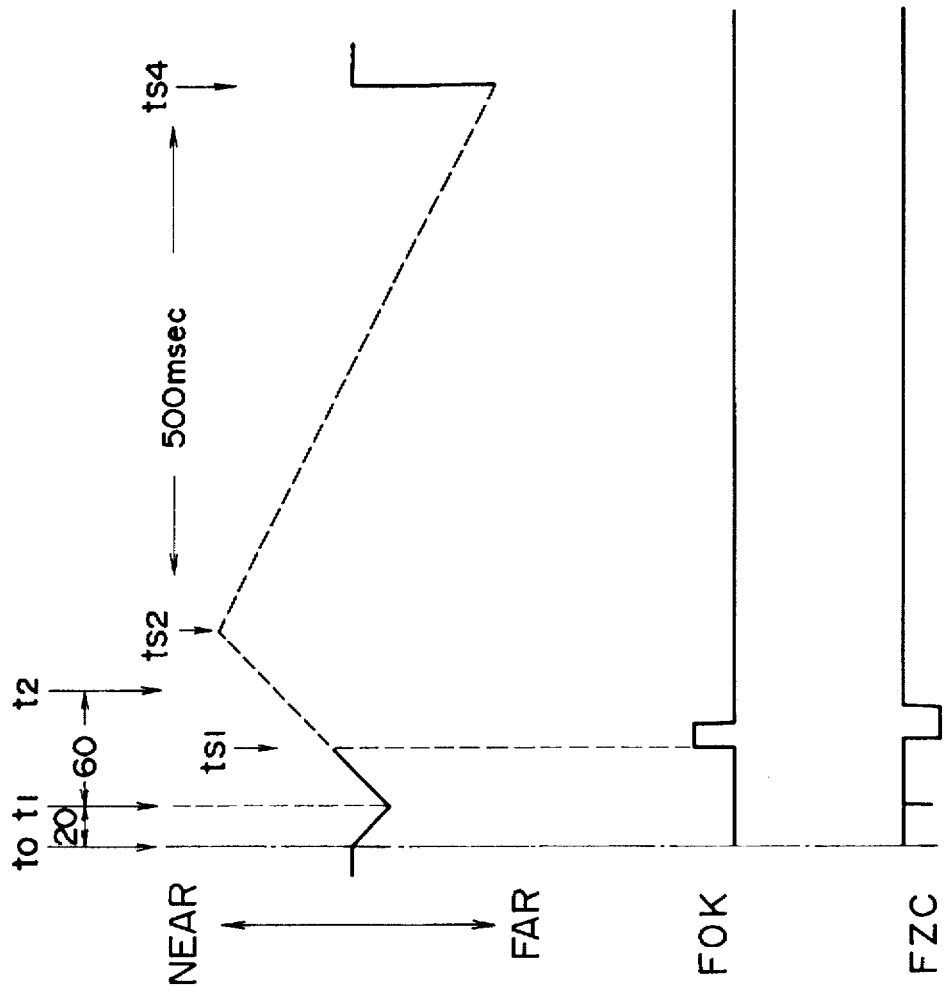
FIGS. 16(a) through 16(c) are diagrams of assistance in explaining the focus search operation of the focusing servo system in the third embodiment.

Suppose that the FOK signal goes HIGH at time $t_{s1}$, i.e., the response to a query in step F306 is affirmative, in a period between times $t_1$ and $t_2$ as shown in FIG. 15(b) during the high-speed up-search operation. Then, the system controller 50 starts (F312) the second stage of the focus search procedure. Actually, the high-speed up-search operation is continued for 60 msec between times $t_{s1}$ and $t_{s2}$ in step F310 after the FOK signal has gone HIGH. At time $t_{s2}$, the system controller 50 turns off the switch $SW_{40}$ and turns on the switch $SW_{50}$ in step F312 to supply a current from the current source 56 to the focusing coil of the actuator 4 for a low-speed down-search operation. The system controller 50 monitors the FOK signal and the FZC signal during the low-speed down-search operation. Upon the detection of the change of the FOK signal from LOW to HIGH and the fall of the FZC signal at time $t_{s3}$ (FIGS. 15(b), 15(c)) in step F313 during the low-speed down-search operation, the system controller 50 turns off the switch $SW_{10}$ and turns on the switch $SW_{20}$ to terminate the focus search operation by closing the focusing servo loop and to activate the focusing servo in step F315. If, instead, the low-speed down-search operation is continued for 500 msec till time $t_{s4}$ and the FOK signal does not go HIGH and the FZC signal does not fall during this period as shown in FIGS. 16(a) and 16(c), it is decided (F314) that the focus search operation is abortive, the focus search operation is terminated, and then the focus search operation is started again from the beginning (F314→F309→F301).

Figures 17A, 17B, 17C:
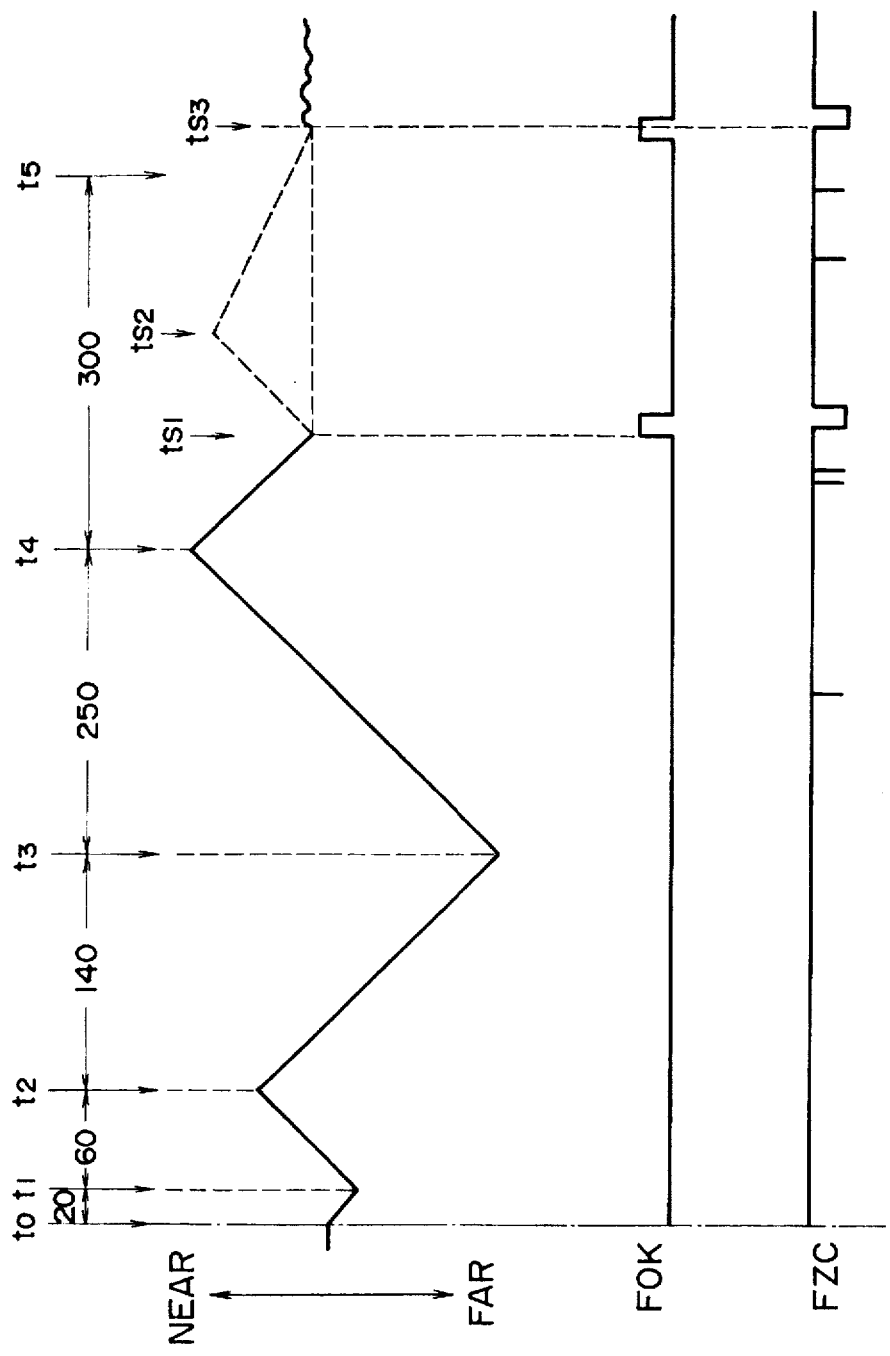
FIGS. 17(a) through 17(c) are diagrams of assistance in explaining the focus search operation of the focusing servo system in the third embodiment.

The focus search operation in another mode will be described hereinafter. Suppose that the change of the FOK signal from LOW to HIGH is detected in step F303 at time $t_{s2}$ as shown in FIGS. 17(a) and 17(b) in a period between times $t_4$ and $t_5$ (FIG. 14) during the high-speed down-search operation in the first stage of the focus search operation. Then, the system controller 50 starts (F312) the second stage of the focus search operation. Prior to starting the second stage of the focus search operation, the switch $SW_{60}$ is turned off and the switch $SW_{40}$ is turned on at time $t_{s1}$ to execute high-speed up-search operation in step F311 instead of the high-speed down-search operation as indicated by broken lines in FIG. 17(a). Then, 60 msec after the focus searching mode at time $t_{s1}$ the switch $SW_{40}$ is turned off and the switch $SW_{50}$ is turned on at time $t_{s2}$ in step F312 to supply a current to the focusing coil of the actuator 4 from the current source 56 for a low-speed down-search operation.

The FOK signal and the FZC signal are monitored (F313) during the low-speed down-search operation. Upon the detection of the change of the FOK signal from LOW to HIGH and the fall of the FZC signal in step F313 as shown in FIGS. 17(b) and 17(c), the switch $SW_{10}$ is turned off and the switch $SW_{20}$ is turned on to terminate the focus search operation by closing the focusing servo loop and to activate the focusing servo in step F315. If the FOK signal does not go HIGH and the FZC signal does not fall during the low-speed down-search operation in the second stage in 500 msec, it is decided (F314) that the focus search operation is abortive, the focus search operation is terminated in step F309, and then the focus search procedure returns to step F301 to start the focus search operation again from the beginning. (F314→F309→F301).

Thus, the focus search operation is performed in the high-speed search mode in the first stage and in the low-speed mode in the second stage to make a quick approach to the focusing servo enable range in the high-speed search mode in the first stage and to ensure detecting the in-focus position in the low-speed search mode in the second stage and, consequently, the focus search operation can be quickly and reliably achieved.

The focusing servo system in the third embodiment executes the high-speed up search operation for 60 msec in both the case in which the FOK signal goes HIGH during the high-speed up-search operation in the first stage and the case in which the FOK signal goes HIGH during the high-speed down-search operation in the first stage before starting the low-speed down-search operation in the second stage, which is a suitable mode of operation for a magnetooptic disk recording/reproducing apparatus. When the recording surface of a magnetooptic disk is irradiated with a light beam, both the magnetooptic recording film and the lower protective film (middle layer) underlying the magnetooptic recording film reflect the light beam. Therefore, when the objective lens is located near the in-focus position with respect to the protective film, a false S-shaped focus error signal is produced. The amplitude of the false S-shaped focus error signal is smaller than that of a true S-shaped focus error signal provided on the basis of the light beam reflected by the magnetooptic recording film. When the RF amplifier 7 is provided with an AGC circuit, the respective amplitudes of the false S-shaped focus error signal and the true S-shaped focus error signal are substantially equal to each other, which entails erroneous in-focus position detection. Since the true S-shaped focus error signal is obtained first and such erroneous focus error detection can be avoided when the objective lens is moved from a position near the disk toward the disk, the focusing servo system in the third embodiment executes the down-search operation in the second stage. The focusing servo system may execute a low-speed up-search operation using the current source 54 in the second stage when the focusing servo system is used on an apparatus in which erroneous focus error detection will not occur.

The focusing servo system in the third embodiment may execute an up-search operation first instead of the 20 msec high-speed down search. However, since the objective lens is located in most cases near the in-focus position while the focusing coil of the actuator 4 is not energized, the probability of the FOK signal going HIGH in the earlier stage of the focusing operation is higher when an up-search operation is executed after a short-time down-search operation has been executed.

Since the focusing servo system in the third embodiment expands the range of search gradually in the first stage, the objective lens will not collide against the disk and noise due to the collision of the objective lens against the disk will not be generated even if the focus search operation is performed with the objective lens located at the position nearest to or the farthest from the disk.

Figure 19A:
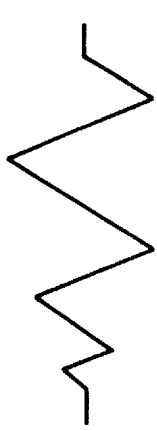
FIGS. 19(a) and 19(b) are diagrams of assistance in explaining another first search operation of the focusing servo system in the third embodiment.
Figure 19B:
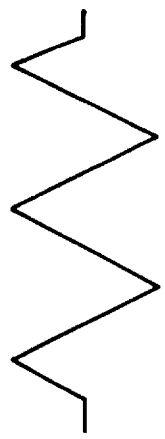

The focusing servo system may repeat the focus search operation in a fixed range of search as shown in FIG. 19(b) instead of gradually expanding the range of search as shown in FIG. 19(a).

The termination of the high-speed search operation in the first stage may be decided on the basis of the condition of the FZC signal or on the basis of both the conditions of the FOK signal and the FZC signal instead of the condition of the FOK signal. The focusing servo system in the third embodiment may terminate the first stage for the high-speed search mode and start the second stage for the low-speed search mode immediately after the detection of the FOK signal going HIGH instead of starting the second stage for the low-speed search mode 60 msec after the detection of the FOK signal going HIGH in the first stage. For example, the second stage for the low-search mode may be started upon the detection of the FOK signal going HIGH, and the low-speed up-search operation and the low-speed down-search operation may be repeated alternately in a range around a position where the objective lens is located at the detection of the FOK signal going HIGH.

Although the invention has been described as applied to the magnetooptic recording/reproducing apparatus, the present invention is applicable also to recording apparatus and reproducing apparatus that operate a compact disk or a disk-shaped recording medium.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A focusing servo system that executes a focus search procedure in which a light beam projected from an objective lens on to the surface of a disk-shaped recording medium is focused by driving the objective lens in a direction perpendicular to the disk medium surface on the basis of predetermined driving signals to detect an in focus condition, at which point a focusing servo loop is closed to carry out a focusing servo operation to acquire and maintain focus of the light beam on the recording medium, said focusing servo system comprising:

a first focus search drive signal generator which drives the objective lens at a relatively high velocity $V_H$ either toward the recording medium surface or away from the recording medium surface for a first high speed search operation;

a second focus search drive signal generator which drives the objective lens at a relatively low velocity $V_L$ away from the recording medium surface in a second low speed search operation, where $V_L < V_H$;

a light beam detector for generating a focusing error signal $E_f$, a sum signal $R_f$, a focus acquisition enable range detection signal FOK which is on when $R_f$ is above a threshold value, and a zero crossing signal FZC which is pulsed on when $E_f$ equals a reference voltage $V_{ref}$; and a controller supplied with the FOK signal and the FZC signal for engaging the first focus search drive signal generator to perform the first high speed search operation until the FOK signal is detected as being HIGH, then causing the first focus search drive signal generator to drive the objective lens at the velocity $V_H$ toward the recording medium surface for a predetermined period of time, then causing the second focus search drive signal generator to perform the second low speed search operation until the controller simultaneously detects that the FOK signal is high and the amplitude of the FZC signal is falling, and then closing the focusing servo loop.

2. The focusing servo system of claim 1, wherein the predetermined time period is 60 msec.

3. A focusing servo method that executes a focus search procedure in which a light beam projected from an objective lens on to the surface of a disk-shaped recording medium is focused by driving the objective lens in a direction perpendicular to the disk medium surface on the basis of predetermined driving signals to detect an in focus condition, at which point a focusing servo loo said focusing servo method comprising the steps of:

a first high speed focus search operation during which the objective lens is driven at a relatively high velocity $V_H$ either toward the recording medium surface or away from the recording medium surface;

a second low speed focus search drive operation during which the objective lens is driven at a relatively low velocity $V_L$ away from the recording medium surface, where $V_L < V_H$;

detecting a light beam reflected from the recording medium surface and generating therefrom a focussing error signal $E_f$, a sum signal $R_f$, a focus acquisition enable range detection signal FOK which is HIGH when $R_f$ is above a threshold value, and a zero crossing signal FZC which is pulsed on when $E_f$ equals a reference voltage $V_{ref}$;

performing the first high speed search operation until the FOK signal is detected as being HIGH, then driving the objective lens at the velocity $V_H$ toward the recording medium surface for a predetermined period of time, then performing the second low speed search operation until, simultaneously, the FOK signal is HIGH and the amplitude of the FZC signal is falling, and then closing the focusing servo loop.

4. The focusing servo method of claim 3, wherein the predetermined time period is 60 msec.

* * * * *

UNITED STATES PATENT AND TRADEMARK OFFICE
CERTIFICATE OF CORRECTION

PATENT NO.: 5,745,450
DATED: April 28, 1998
INVENTOR(S): SHUNICHI MIYAZONO

It is certified that errors appear in the above-identified patent and that said Letters Patent is hereby corrected as shown below:

In Col. 18, line 32, please change "on" to --HIGH--; and
In Col. 18, line 57, please change "loo" to --loop is closed to carry out a focusing servo operation to acquire and maintain focus of the light beam on the recording medium,--.

On the title page item 56 add

U.S. PATENT APPLICATIONS

08/221,892    Miyazono    filed 3/30/94
08/808,667    Miyazono    filed 2/28/97

Signed and Sealed this

Twenty-fifth Day of May, 1999

Attest:

Q. TODD DICKINSON

Attesting Officer      Acting Commissioner of Patents and Trademarks